(12) United States Patent
Li et al.

(10) Patent No.: US 10,862,642 B2
(45) Date of Patent: Dec. 8, 2020

(54) WIRELESS COMMUNICATION METHOD AND APPARATUS

(71) Applicant: Huawei Technologies Co., Ltd., Shenzhen (CN)

(72) Inventors: Hua Li, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/234,887

(22) Filed: Dec. 28, 2018

(65) Prior Publication Data

US 2019/0140798 A1    May 9, 2019

Related U.S. Application Data

(63) Continuation of application No. PCT/CN2017/090906, filed on Jun. 29, 2017.

(30) Foreign Application Priority Data

Jul. 5, 2016   (CN) .......................... 2016 1 0525438

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0404* (2013.01); *H04B 7/0602* (2013.01);
(Continued)

(58) Field of Classification Search
None
See application file for complete search history.

(56) References Cited

U.S. PATENT DOCUMENTS 9,025,471 B2   5/2015 Mehta et al.
2009/0303955 A1   12/2009 Teo et al.
(Continued)

FOREIGN PATENT DOCUMENTS

CN   101969337 A   2/2011
CN   103905104 A   7/2014
(Continued)

OTHER PUBLICATIONS

3GPP TS 36.211 V13.1.0 (Mar. 2016), 3rd Generation Partnership Project; Technical Specification Group Radio Access Network; Evolved Universal Terrestrial Radio Access (E-UTRA); Physical channels and modulation (Release 13), total 155 pages.

*Primary Examiner* — Jay L Vogel
(74) *Attorney, Agent, or Firm* — Slater Matsil, LLP

(57) ABSTRACT

A wireless communication method and apparatus are disclosed. In an embodiment a wireless communication method includes determining, by a terminal device, based on N first ports, within a first time unit for a first channel or a first signal, M second ports within the first time unit for a second channel or a second signal, wherein T≥N≥1, T≥M≥1, and wherein T is a maximum number of ports usable at the same time unit by the terminal device during sending, sending, by the terminal device, within the first time unit, the first channel or the first signal by using the N first ports and sending, by the terminal device, within the first time unit, the second channel or the second signal by using the M second ports.

12 Claims, 10 Drawing Sheets

200

A terminal device determines, based on N first ports that are used, within a first time unit, for a first channel or a first signal, M second ports that are used, within the first time unit, for a second channel or a second signal, where T≥N≥1, T≥M≥1, and T is a maximum quantity of ports usable at a same moment by the terminal device during sending  — S210

The terminal device sends, within the first time unit, the first channel or the first signal by using the N first ports, and the terminal device sends, within the first time unit, the second channel or the second signal by using the M second ports  — S220

(51) Int. Cl.
*H04B 7/0404* (2017.01)
*H04L 25/02* (2006.01)
*H04W 72/04* (2009.01)

(52) U.S. Cl.
CPC ............ *H04B 7/0617* (2013.01); *H04L 5/00* (2013.01); *H04L 5/0051* (2013.01); *H04L 25/0224* (2013.01); *H04W 72/0413* (2013.01); *H04W 72/0446* (2013.01); *H04L 5/0007* (2013.01)

(56) References Cited

U.S. PATENT DOCUMENTS

| | | | |
|---|---|---|---|
| 2011/0211569 A1* | 9/2011 | Koivisto | H04B 7/0682 370/345 |
| 2013/0039386 A1* | 2/2013 | Zhou | H04B 7/0691 375/135 |
| 2015/0381246 A1 | 12/2015 | Huang et al. | |
| 2016/0164593 A1* | 6/2016 | Lee | G07F 9/00 370/329 |
| 2016/0183218 A1 | 6/2016 | Ioffe et al. | |
| 2019/0165826 A1* | 5/2019 | Goto | H04L 5/0051 |

FOREIGN PATENT DOCUMENTS

| | | |
|---|---|---|
| JP | 2010518675 A | 5/2010 |
| WO | 2012019415 A1 | 2/2012 |

\* cited by examiner

200

A terminal device determines, based on N first ports that are used, within a first time unit, for a first channel or a first signal, M second ports that are used, within the first time unit, for a second channel or a second signal, where $T \geq N \geq 1$, $T \geq M \geq 1$, and T is a maximum quantity of ports usable at a same moment by the terminal device during sending — S210

The terminal device sends, within the first time unit, the first channel or the first signal by using the N first ports, and the terminal device sends, within the first time unit, the second channel or the second signal by using the M second ports — S220

FIG. 3

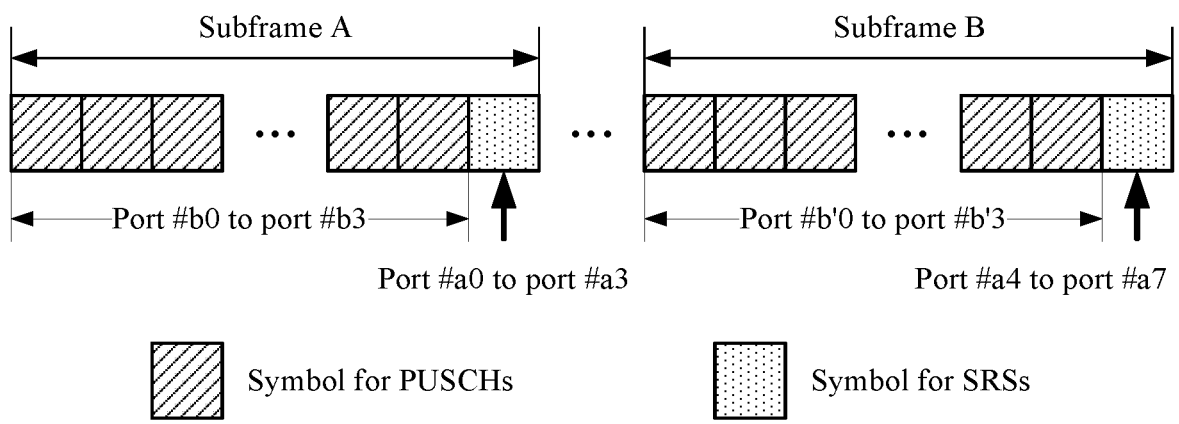

A network device determines, based on N first ports that are used, within a first time unit, for a first channel or a first signal of a terminal device, M second ports that are used, within the first time unit, for a second channel or a second signal of the terminal device, where $T \geq N \geq 1$, $T \geq M \geq 1$, and T is a maximum quantity of ports usable at a same moment by the terminal device during sending — S310

The network device determines, based on the M second ports, signaling that is for the second channel or the second signal — S320

The network device sends the signaling to the terminal device — S330

The network device receives, within the first time unit, the first channel or the first signal sent by the terminal device, and the second channel or the second signal sent by the terminal device, where the first channel or the first signal is sent by the terminal device by using the N first ports, and the second channel or the second signal is sent by the terminal device based on the signaling by using the M second ports — S340

FIG. 13

WIRELESS COMMUNICATION METHOD AND APPARATUS

CROSS-REFERENCE TO RELATED APPLICATIONS

This application is a continuation of International Application No. PCT/CN2017/090906, filed on Jun. 29, 2017, which claims priority to Chinese Patent Application No. 201610525438.0, filed on Jul. 5, 2016. The disclosures of the aforementioned applications are hereby incorporated by reference in their entireties.

TECHNICAL FIELD

Embodiments of the present invention relate to the communications field, and more specifically, to a wireless communication method and apparatus.

BACKGROUND

With the development of mobile Internet technologies and the application of the 4th generation mobile communications technology (4G), communication capacity demands are increasing rapidly. The communication capacity can be effectively improved by increasing downlink flows by using multiple-antenna technologies. To ensure downlink transmission quality, a terminal device sends sounding reference signals (SRS) of ports of the terminal device to a network device, and the network device determines, based on the SRSs, channel states of channels corresponding to the ports, so as to use, based on the channel states of the channels, the channels to perform downlink transmission, where one port may correspond to one antenna.

Generally, limited by hardware, a quantity of transmit channels of the terminal device (that is, a maximum quantity of ports usable at a same moment by the terminal device during signal sending) is less than a quantity of receive channels (that is, a maximum quantity of ports usable at a same moment by the terminal device during signal reception), and therefore the terminal device cannot send SRSs by using all antennas at a same time, or in other words, the terminal device cannot send SRSs of all ports at a same time.

Currently, in a known wireless communications technology, a terminal device sends SRSs of different ports in different uplink symbols, so as to traverse all ports.

It is assumed that a terminal device has eight antennas (denoted as: antenna 0 to antenna 7). In other words, the terminal device needs to send SRSs of eight ports (denoted as: port 0 to port 7). However, the terminal device only has four transmit channels; therefore, the terminal device may send the SRSs of the eight SRS ports in a time division manner, where the eight antennas are in a one-to-one correspondence with the eight ports.

As shown in FIG. 1, using a Long Term Evolution (LTE) system as an example, an SRS is usually borne in a last symbol of one uplink subframe, and (all or some) symbols preceding the symbol are used to bear physical uplink shared channels (PUSCH). At a sending opportunity of one uplink subframe, a terminal device may send SRSs of the port 0 to the port 3 (in other words, a terminal device may send SRSs by using an antenna 0 to an antenna 3). At a sending opportunity of another uplink subframe, the terminal device may send SRSs of the port 4 to the port 7 (in other words, the terminal device may send SRSs by using an antenna 4 to an antenna 7). In this way, by using the two sending opportunities, a network device can receive the SRSs of all the eight ports of the terminal device.

In addition, in LTE, a maximum of four PUSCH ports is supported, for example, the foregoing ports 0 to 3 (or the antennas 0 to 3). This means that PUSCHs can be sent only by using the ports 0 to 3.

Generally, an SRS and a PUSCH are adjacent, and therefore it is possible that the terminal device needs to send the PUSCHs and the SRSs of the port 4 to the port 7 in a same uplink subframe. In this case, the terminal device needs to perform transmit antenna switching. The transmit antenna switching may affect SRS transmission, thereby affecting wireless communication performance.

SUMMARY

Embodiments of the present invention provide a wireless communication method and apparatus, so as to improve wireless communication performance.

According to a first aspect, a wireless communication method is provided. The method includes: determining, by a terminal device, based on N first ports that are used, within a first time unit, for a first channel or a first signal, M second ports that are used, within the first time unit, for a second channel or a second signal, where T≥N≥1, T≥M≥1, and T is a maximum quantity of ports usable at a same moment by the terminal device during sending; and sending, by the terminal device, within the first time unit, the first channel or the first signal by using the N first ports, and sending, by the terminal device, within the first time unit, the second channel or the second signal by using the M second ports.

According to the wireless communication method in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved.

In a possible implementation of the first aspect, the method further includes: determining, by the terminal device, at least two first port groups, where each first port group includes at least one port that is used for the first channel or the first signal, and a quantity of ports included in each first port group is less than or equal to the maximum quantity T; determining, by the terminal device, at least two second port groups, where each second port group includes at least one port that is used for the second channel or the second signal, and a quantity of ports included in each second port group is less than or equal to the maximum quantity T; obtaining, by the terminal device, mapping relationship information, where the mapping relationship information is used to indicate a one-to-one correspondence between the at least two first port groups and the at least two second port groups; and determining, by a terminal device, based on N first ports that are used, within a first time unit, for a first channel or a first signal, M second ports that correspond, within the first time unit, to a second channel or a second signal includes: determining, by the terminal device, a target first port group from the at least two first port groups, where the N first ports belong to a same port group, and the target first port group includes the N first ports;

determining, by the terminal device, based on the mapping relationship information, a target second port group corresponding to the target first port group from the at least two second port groups; and determining, by the terminal device, the M second ports from the target second port group.

A mapping relationship between a plurality of first port groups and a plurality of second port groups is preconfigured, and after the target first port group to which the N first ports belong is determined, the target second port group corresponding to the target first port group can be easily determined based on the mapping relationship, so that the M second ports can be easily determined from the target second port group. In this way, efficiency of the wireless communication method in this embodiment of the present invention is improved, and communication performance is further improved.

In another possible implementation of the first aspect, the method further includes: receiving, by the terminal device, signaling that is sent by a network device and that is for the second channel or the second signal, where the signaling is determined by the network device based on the M second ports; and the sending, by the terminal device, within the first time unit, the second channel or the second signal by using the M second ports includes: sending, by the terminal device, within the first time unit, the second channel or the second signal based on the signaling by using the M second ports.

By making the network device determine, based on the M second ports, the signaling used to indicate a configuration parameter that is used when the terminal device sends the second channel or the second signal, and by making the network device send the signaling to the terminal device, transmission accuracy and reliability of the second channel or the second signal can be improved, and communication performance is further improved.

In still another possible implementation of the first aspect, the method further includes: sending, by the terminal device, first indication information to the network device, where the first indication information is used to indicate the maximum quantity T of ports usable at a same moment by the terminal device during channel or signal sending.

In yet another possible implementation of the first aspect, the method further includes: receiving, by the terminal device, second indication information sent by the network device, where the second indication information is used to indicate the N first ports; and determining, by the terminal device, the N first ports based on the second indication information.

In still yet another possible implementation of the first aspect, the sending, by the terminal device, within the first time unit, the first channel or the first signal by using the N first ports, and sending, by the terminal device, within the first time unit, the second channel or the second signal by using the M second ports includes: sending, by the terminal device, within a first time period of the first time unit, the first channel or the first signal by using the N first ports, and sending, by the terminal device, within a second time period of the first time unit, the second channel or the second signal by using the M second ports.

In a further possible implementation of the first aspect, the sending, by the terminal device, within the first time unit, the first channel or the first signal by using the N first ports, and sending, by the terminal device, within the first time unit, the second channel or the second signal by using the M second ports includes: sending, by the terminal device, within the first time unit, the first channel or the first signal on a first frequency band by using the N first ports, and the second channel or the second signal on a second frequency band by using the M second ports.

According to a second aspect, a wireless communication method is provided. The method includes: determining, by a network device, based on N first ports that are used, within a first time unit, for a first channel or a first signal of a terminal device, M second ports that are used, within the first time unit, for a second channel or a second signal of the terminal device, where $T \geq N \geq 1$, $T \geq M \geq 1$, and T is a maximum quantity of ports usable at a same moment by the terminal device during sending; determining, by the network device, based on the M second ports, signaling that is for the second channel or the second signal; sending, by the network device, the signaling to the terminal device; and receiving, by the network device, within the first time unit, the first channel or the first signal sent by the terminal device, and the second channel or the second signal sent by the terminal device, where the first channel or the first signal is sent by the terminal device by using the N first ports, and the second channel or the second signal is sent by the terminal device based on the signaling by using the M second ports.

According to the wireless communication method in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved. In addition, by making the network device determine, based on the M second ports, the signaling used to indicate a configuration parameter that is used when the terminal device sends the second channel or the second signal, and by making the network device send the signaling to the terminal device, transmission accuracy and reliability of the second channel or the second signal can be improved, and communication performance is further improved.

In a possible implementation of the second aspect, the method further includes: determining, by the network device, at least two first port groups, where each first port group includes at least one port, of the terminal device, used for the first channel or the first signal, and a quantity of ports included in each first port group is less than or equal to the maximum quantity T; determining, by the network device, at least two second port groups, where each second port group includes at least one port, of the terminal device, used for the second channel or the second signal, and a quantity of ports included in each second port group is less than or equal to the maximum quantity T; obtaining, by the terminal device, mapping relationship information, where the mapping relationship information is used to indicate a one-to-one correspondence between the at least two first port groups and the at least two second port groups; and determining, by a network device, based on N first ports that are used, within a first time unit, for a first channel or a first signal of a terminal device, M second ports that are used, within the first time unit, for a second channel or a second signal of the terminal device includes: determining, by the network device, a target first port group from the at least two first port groups, where the N first ports belong to a same port group, and the target first port group includes the N first ports; determining, by the network device, based on the mapping relationship information, a target second port group corresponding to the target first port group from the at least two second port groups; and determining, by the network device, the M second ports from the target second port group.

In another possible implementation of the second aspect, the method further includes: receiving, by the network device, first indication information sent by the terminal device, where the first indication information is used to indicate the maximum quantity T of ports usable at a same moment by the terminal device during channel or signal sending; and determining, by the network device, the maximum quantity T based on the first indication information.

In still another possible implementation of the second aspect, the method further includes: sending, by the network device, second indication information to the terminal device, where the second indication information is used to indicate the N first ports.

In yet another possible implementation of the second aspect, the receiving, by the network device, within the first time unit, the first channel or the first signal sent by the terminal device, and the second channel or the second signal sent by the terminal device includes: receiving, by the network device, within a first time period of the first time unit, the first channel or the first signal, and receiving, by the network device, within a second time period of the first time unit, the second channel or the second signal.

In still yet another possible implementation of the second aspect, the receiving, by the network device, within the first time unit, the first channel or the first signal sent by the terminal device, and the second channel or the second signal sent by the terminal device includes: receiving, by the network device, within the first time unit, the first channel or the first signal on a first frequency band, and the second channel or the second signal on a second frequency band.

According to a third aspect, a wireless communications apparatus is provided, including units configured to perform the steps of the wireless communication method in the first aspect and the implementations of the first aspect.

According to a fourth aspect, a wireless communications apparatus is provided, including units configured to perform the steps of the wireless communication method in the second aspect and the implementations of the second aspect.

According to a fifth aspect, a wireless communications device is provided, including a memory and a processor, where the memory is configured to store a computer program, and the processor is configured to call and run the computer program in the memory, so that a terminal device performs the wireless communication method in any one of the first aspect and the implementations of the first aspect.

According to a sixth aspect, a wireless communications device is provided, including a memory and a processor, where the memory is configured to store a computer program, and the processor is configured to call and run the computer program in the memory, so that a network device performs the wireless communication method in any one of the second aspect and the implementations of the second aspect.

According to a seventh aspect, a computer program product is provided, where the computer program product includes computer program code, and when the computer program code is run by a communications unit and a processing unit, or a transceiver and a processor, of a terminal device, the terminal device performs the wireless communication method in any one of the first aspect and the implementations of the first aspect.

According to an eighth aspect, a computer program product is provided, where the computer program product includes computer program code, and when the computer program code is run by a communications unit and a processing unit, or a transceiver and a processor, of a terminal device, a network device performs the wireless communication method in any one of the second aspect and the implementations of the second aspect.

According to a ninth aspect, a computer readable storage medium is provided, where the computer readable storage medium stores a program, and the program enables a terminal device to perform the wireless communication method in any one of the first aspect and the implementations of the first aspect.

According to a tenth aspect, a computer readable storage medium is provided, where the computer readable storage medium stores a program, and the program enables a network device to perform the wireless communication method in any one of the second aspect and the implementations of the second aspect.

With respect to the foregoing aspects, in a possible implementation, the terminal device is provided with at least two antennas, the N first ports correspond to at least one first antenna, the M second ports correspond to at least one second antenna, and the first antenna and the second antenna include at least one same antenna.

With respect to the foregoing aspects, in another possible implementation, the terminal device is provided with at least two antennas, a port that is used for the first channel or the first signal and that corresponds to one antenna belongs to only one first port group, a port that is used for the second channel or the second signal and that corresponds to one antenna belongs to only one second port group, and in the correspondence indicated by the mapping relationship information, antennas corresponding to any pair of a first port group and a second port group that correspond to each other include at least one same antenna.

With respect to the foregoing aspects, in still another possible implementation, there is a preset guard interval before the first time period and/or the second time period.

With respect to the foregoing aspects, in yet another possible implementation, the first signal is a sounding reference signal SRS, and the second channel is a physical uplink data channel PUSCH or a physical uplink control channel PUCCH; or the first channel is a PUSCH or a PUCCH, and the second signal is an SRS.

In a still further possible implementation of the first aspect, one time unit includes at least one subframe; or one time unit includes at least one timeslot; or one time unit includes at least one symbol.

BRIEF DESCRIPTION OF THE DRAWINGS

FIG. 3 is a schematic flowchart of a wireless communication method according to one of the embodiments of the present invention;

FIG. 4 is a schematic diagram of a transmission mode for SRSs and PUSCHs according to an embodiment of the present invention;

FIG. 13 is a schematic flowchart of a wireless communication method according to another one of the embodiments of the present invention;

DETAILED DESCRIPTION OF ILLUSTRATIVE EMBODIMENTS

Figure 1:
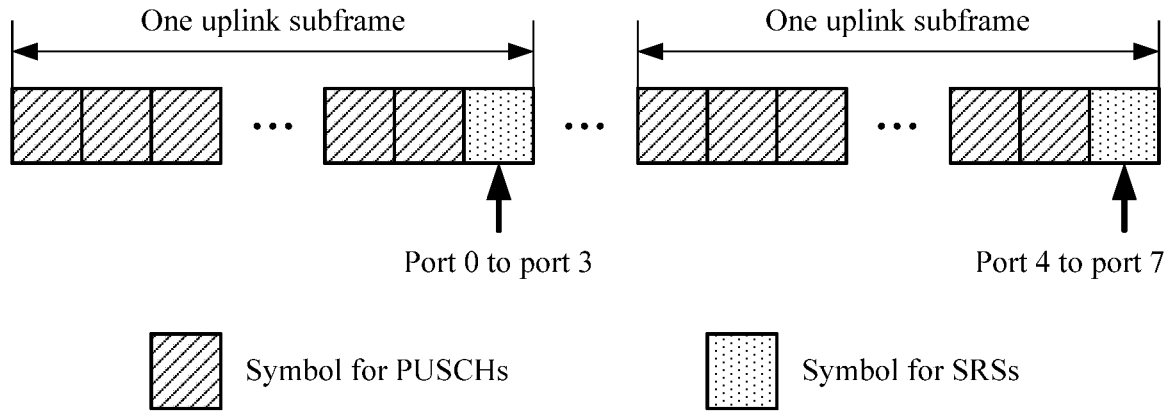
FIG. 1 is a schematic diagram of a transmission mode for SRSs and PUSCHs in the prior art.

A wireless communication method, apparatus, and device that are provided in embodiments of the present invention may be applied to a computer. The computer includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing by using a process, such as the Linux operating system, the UNIX operating system, the Android operating system, the iOS operating system, or the Windows operating system. The application layer includes applications such as a browser, a contact list, a word processing software, and an instant communication software. In addition, in the embodiments of the present invention, the computer may be a handheld device such as a smartphone, or may be a terminal device such as a personal computer. This is not particularly limited in the embodiments of the present invention provided that data can be processed according to the wireless communication method in the embodiments of the present invention by running a program that records code of the wireless communication method in the embodiments of the present invention. The wireless communication method in the embodiments of the present invention may be executed by a computer device or a function module that is inside a computer device and that is capable of calling and executing a program.

In addition, each aspect or feature of the embodiments of the present invention may be implemented as a method, an apparatus or a product that uses standard programming and/or engineering technologies. The term "product" used in this application covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, erasable programmable read-only memory (EPROM), a card, a stick, or a key drive). In addition, various storage media described in this specification may indicate one or more devices and/or other machine readable media that are used to store information. The term "machine readable media" may include but is not limited to a radio channel, and various other media that can store, contain and/or carry an instruction and/or data.

The solutions in the embodiments of the present invention may be applied to an existing cellular communications system, such as a Global System for Mobile Communications (GSM) system, a Wideband Code Division Multiple Access (WCDMA) system, a Long Term Evolution (LTE) system, or a next-generation mobile communications system. As an example but not a limitation, the next-generation mobile communications system supports not only conventional communication, but also machine to machine (M2M) communication that is also referred to as machine type communication (MTC).

Optionally, the network device is a base station, and the terminal device is user equipment.

The embodiments are described with respect to a terminal device in the embodiments of the present invention. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a Session Initiation Protocol (SIP) phone, a wireless local loop (WLL) station, a personal digital assistant (PDA), a handheld device or computing device provided with a wireless communications function, another processing device connected to a wireless modem, an in-vehicle device, a wearable device, a terminal device in a future 5G network, a terminal device in a future evolved PLMN network, or the like.

In addition, the embodiments are described with respect to a network device in the embodiments of the present invention. The network device may be a device configured to communicate with a mobile device. The network device may be an access point (AP) in a wireless local area network (WLAN), a base transceiver station (BTS) in GSM or Code Division Multiple Access (CDMA), a NodeB (NB) in WCDMA, an evolved NodeB (eNB or eNodeB) in Long Term Evolution (LTE), a relay node or an access point, an in-vehicle device, a wearable device, a network device in a future 5G network or a network device in a future evolved PLMN network, or the like.

Figure 2:
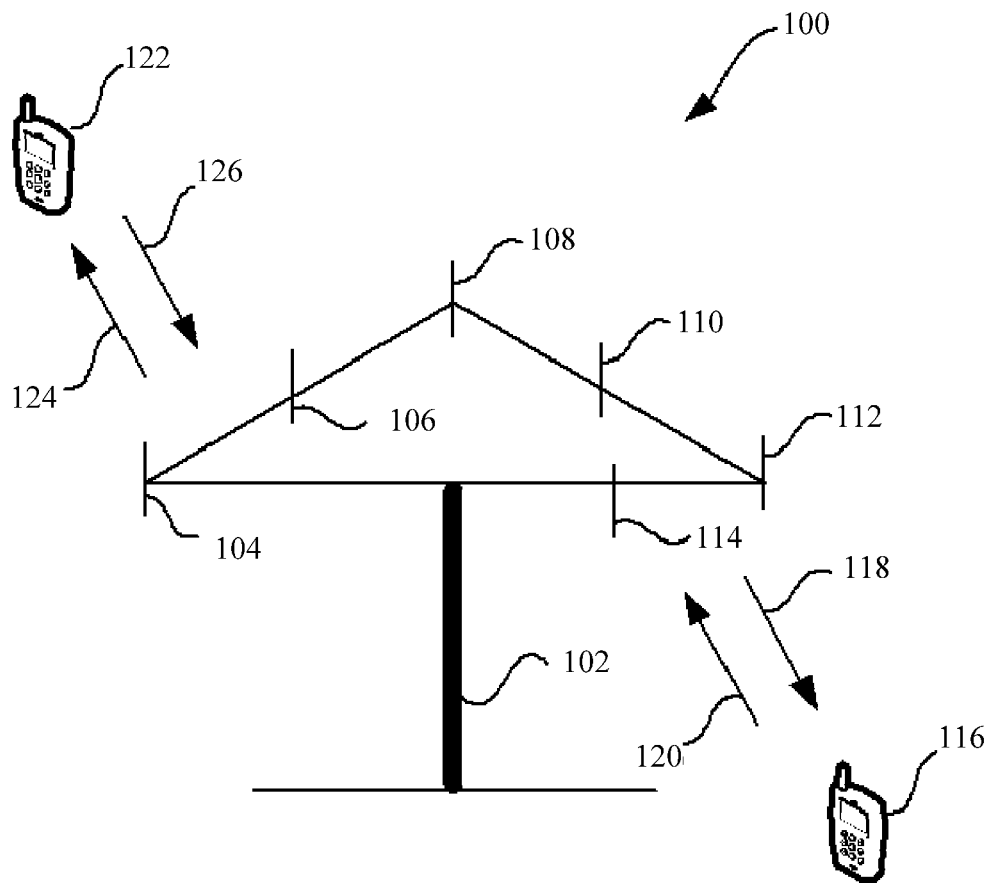
FIG. 2 is a schematic flowchart of an example of a communications system to which a wireless communication method and apparatus according to embodiments of the present invention are applicable.

FIG. 2 is a schematic diagram of a communications system to which the wireless communication method according to the embodiments of the present invention is applicable. As shown in FIG. 2, the communications system 100 includes a network device 102, and the network device 102 may include a plurality of antennas, for example, antennas 104, 106, 108, 110, 112, and 114. In addition, the network device 102 may additionally include a transmitter chain and a receiver chain. It can be understood by persons of ordinary skill in the art that both the transmitter chain and the receiver chain may include a plurality of components that are related to signal transmission and reception (such as a processor, a modulator, a multiplexer, a demodulator, a demultiplexer, or an antenna).

The network device 102 may communicate with a plurality of terminal devices (such as a terminal device 116 and a terminal device 122). However, it can be understood that the network device 102 may communicate with any quantity of terminal devices like the terminal device 116 or 122. The terminal devices 116 and 122 may be cellular phones, smartphones, portable computers, handheld communications devices, handheld computing devices, satellite radio apparatuses, global positioning systems, PDAs, and/or any other appropriate devices that are configured to perform communication in the wireless communications system 100.

As shown in FIG. 2, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, a frequency band different from that used for the reverse link 120 may be used for the forward link 118, and a frequency band different from that used for the reverse link 126 may be used for the forward link 124.

For another example, in a time division duplex (TDD) system or a full duplex system, a same frequency band may be used for the forward link 118 and the reverse link 120, and a same frequency band may be used for the forward link 124 and the reverse link 126.

Each antenna (or an antenna group including a plurality of antennas) and/or a region that are/is designed for communication are/is referred to as a sector of the network device 102. For example, an antenna group may be designed to communicate with a terminal device that is in a sector of a coverage area of the network device 102. In a process of communicating with the terminal devices 116 and 122 by the network device 102 by respectively using the forward links 118 and 124, transmit antennas of the network device 102 may use beamforming to improve signal-to-noise ratios of the forward links 118 and 124. In addition, compared with a manner in which a network device uses a single antenna to send signals to all terminal devices served by the network device, when the network device 102 uses beamforming to send signals to the terminal devices 116 and 122 that are randomly scattered in the related coverage area, interference to a mobile device that is in a neighboring cell is less.

Within a given time, the network device 102, the terminal device 116, or the terminal device 122 may be a wireless communications sending apparatus and/or a wireless communications receiving apparatus. During data sending, the wireless communications sending apparatus may encode the data for use in transmission. Specifically, the wireless communications sending apparatus may obtain (for example, generate, receive from another communications apparatus, or store in a memory) a quantity of data bits that need to be sent, by using a channel, to the wireless communications receiving apparatus. These data bits may be included in a transport block (or a plurality of transport blocks) of the data, and the transport block may be segmented to generate a plurality of code blocks.

In addition, the communications system 100 may be a public land mobile network (PLMN), a D2D network, an M2M network, or another network. FIG. 2 is a simplified schematic diagram used as an example. The network may further include other network devices that are not drawn in FIG. 2. In addition, the quantities of network devices and terminal devices that are included in the communications system 100 shown in FIG. 2 are merely used as an example, and this embodiment of the present invention is not particularly limited.

FIG. 3 is a schematic flowchart of a wireless communication method 200, according to one of the embodiments of the present invention, described from a perspective of a terminal device. As shown in FIG. 3, the method 200 includes the following steps.

S210. The terminal device determines, based on N first ports that are used, within a first time unit, for a first channel or a first signal, M second ports that are used, within the first time unit, for a second channel or a second signal, so that the terminal device does not need to perform antenna switching when sending the first channel or the first signal and the second channel or the second signal within the first time unit, where $T \geq N \geq 1$, $T \geq M \geq 1$, and T is a maximum quantity of ports usable at the same moment by the terminal device during sending.

S220. The terminal device sends, within the first time unit, the first channel or the first signal by using the N first ports, and the terminal device sends, within the first time unit, the second channel or the second signal by using the M second ports.

The method 200 is applicable where at least two types of channels or signals are transmitted within one time unit.

In addition, in this embodiment of the present invention, a channel may be a channel prescribed in an existing or a future communications protocol or communications standard, such as a PUSCH or a physical uplink control channel (PUCCH). Similarly, a signal may be a signal prescribed in an existing or a future communications protocol or communications standard, such as an SRS.

In other words, in this embodiment of the present invention, two or more types of channels or signals are transmitted within one time unit.

Optionally, the first signal is a sounding reference signal (SRS), and the second channel is a physical uplink data channel PUSCH or a physical uplink control channel PUCCH; or the first channel is a PUSCH or a PUCCH, and the second signal is an SRS.

As an example but not a limitation, for example, the first signal may be an SRS. In this case, the second channel may include a channel that is used to transmit uplink data, for example, a PUSCH. Alternatively, the second channel may include a channel that is used to transmit uplink control information, for example, a PUCCH.

For another example, the first channel may include a channel that is used to transmit uplink data, for example, a PUSCH. Alternatively, the first channel may include a channel that is used to transmit uplink control information, for example, a PUCCH. In this case, the second signal may be an SRS.

It should be understood that the above-enumerated specific examples of the first channel or the first signal and the second channel or the second signal are merely used as examples for description. This embodiment of the present invention is not limited thereto, and any other channels or signals that can be transmitted within a same time unit shall fall within the protection scope of this embodiment of the present invention.

In addition, in this embodiment of the present invention, the first channel may include one type of channel, or may include two or more types of channels; the first signal may be one type of signal or two or more types of signals; the second channel may include one type of channel, or may include two or more types of channels; and the second signal may be one type of signal or two or more types of signals. This is not particularly limited in this embodiment of the present invention.

For ease of understanding and description, without loss of generality, the following details a specific process of the method 200 by using an example in which the SRS is the first signal and the PUSCH is the second channel.

The following describes the time unit in this embodiment of the present invention.

Optionally, one time unit includes at least one subframe; or one time unit includes at least one timeslot; or one time unit includes at least one symbol.

Specifically, for example, in this embodiment of the present invention, one time unit may include at least one subframe. In this case, one or more symbols in the at least one subframe may be used to bear the first channel or the first signal, and one or more symbols in the at least one subframe may be used to bear the second channel or the second signal.

For another example, one time unit may include at least one timeslot. In this case, one or more symbols in the at least one timeslot may be used to bear the first channel or the first signal, and one or more symbols in the at least one timeslot may be used to bear the second channel or the second signal.

For another example, one time unit may include at least one symbol. In this case, one or more symbols in the at least one symbol may be used to bear the first channel or the first signal, and one or more symbols in the at least one symbol may be used to bear the second channel or the second signal.

It should be noted that a symbol that bears the first channel or the first signal may be the same as a symbol that bears the second signal or the second channel, and in this case, the first channel or the first signal and the second signal or the second channel may be transmitted by using a same symbol in a frequency division multiplexing manner; or a symbol that bears the first channel or the first signal may be different from a symbol that bears the second signal or the second channel, and in this case, the first channel or the first signal and the second signal or the second channel may be transmitted by using different symbols in a time division multiplexing manner.

It should be understood that, in the above-enumerated time units, a symbol is used as a minimum unit in time domain. However, this embodiment of the present invention is not limited thereto, and a minimum unit of any length in time domain shall fall within the protection scope of this embodiment of the present invention.

In addition, in this embodiment of the present invention, one time unit may be used to transmit only the first channel or the first signal and the second channel or the second signal, or one time unit may be used to transmit also a channel other than the first channel or the first signal and the second channel or the second signal. This is not particularly limited in this embodiment of the present invention.

The following describes a hardware requirement and a transmission capacity requirement for a terminal device to which the method 200 is applied.

Optionally, the terminal device is provided with at least two antennas.

Specifically, in this embodiment of the present invention, the terminal device is provided with K ($K \geq 2$) antennas.

For ease of understanding and description, without loss of generality, the following describes the method 200 by using an example in which the terminal device is provided with 8 ($K=8$) antennas. It should be understood that, the above-enumerated quantities of antennas that the terminal device is provided with are merely used as examples for description. This embodiment of the present invention is not limited thereto, and the method 200 in this embodiment of the present invention can be applied to any terminal device that is provided with at least two antennas.

In this embodiment of the present invention, the terminal device can use, at a same moment, T ($T \geq 1$) ports for channel or signal transmission. In other words, the terminal device can use, at a same moment, T ($T \geq 1$) antennas for channel or signal transmission.

Herein, that "the terminal device can use, at a same moment, T ($T \geq 1$) ports for channel or signal transmission" may mean that when port switching is not performed, a maximum quantity of ports usable within one time unit by the terminal device for signal or channel transmission is T. Similarly, that "the terminal device can use, at a same moment, T ($T \geq 1$) antennas for channel or signal transmission" may mean that when antenna switching is not performed, a maximum quantity of antennas usable within one time unit by the terminal device for signal or channel transmission is T. As an example but not a limitation, T may be determined depending on a quantity of radio frequency channels that are used by the terminal device for transmission.

In addition, in this embodiment of the present invention, the maximum quantity T of antennas (or ports) usable within one time unit by the terminal device for channel or signal transmission is less than the quantity K of antennas that the terminal device is provided with.

That is, in this embodiment of the present invention, K>T.

Using an LTE system as an example, a maximum quantity of uplink signal ports or uplink channel ports usable at a same moment point by the terminal device is 4.

For ease of understanding and description, without loss of generality, the following describes the method 200 by using an example in which the maximum quantity of ports usable at a same moment point by the terminal device during signal transmission is 4, that is, T=4. It should be understood that the above-enumerated specific value of T is merely used as an example for description. This embodiment of the present invention is not limited thereto, and the method 200 in this embodiment of the present invention can be applied to any terminal device that is provided with K antennas, where $K > T \geq 1$.

In addition, in this embodiment of the present invention, for one type of channel or signal, one antenna corresponds to one port of this type of channel or signal.

As an example but not a limitation, when the terminal device is provided with, for example, eight antennas, for SRSs, the eight antennas (denoted as: an antenna #0 to an antenna #7) are in a one-to-one correspondence with eight ports (denoted as: a port #a0 to a port #a7) for SRSs. For example, the antenna #0 corresponds to the port #a0, the antenna #1 corresponds to the port #a1, the antenna #2 corresponds to the port #a2, the antenna #3 corresponds to the port #a3, the antenna #4 corresponds to the port #a4, the antenna #5 corresponds to the port #a5, the antenna #6 corresponds to the port #a6, and the antenna #7 corresponds to the port #a7. In addition, in this embodiment of the present invention, when T=4, the terminal device can use only four antennas of the antenna #0 to the antenna #7 at a same moment to send SRSs, or in other words, the terminal device can send SRSs of only four ports of the port #a0 to the port #a7 at a same moment. That is, when antenna (or port) switching is not performed, within one time unit, the terminal device can use only four antennas to send SRSs, or in other words, the terminal device can send SRSs of only four ports.

In the prior art, a terminal device uses only four antennas (or 4 ports) to send PUSCHs.

Compared with that in the prior art, in this embodiment of the present invention, eight antennas (or eight ports) can be used to send PUSCHs.

In addition, the eight antennas (namely, the antenna #0 to the antenna #7) are in a one-to-one correspondence with the eight ports (denoted as: a port #b0 to a port #b3, and a port #b'0 to a port #b'3) that are used to transmit PUSCHs. It should be noted that, in this embodiment of the present invention, PUSCHs are sent by using four ports within each time unit. That is, the eight ports that are used to transmit PUSCHs are used in a time division manner.

For example, the antenna #0 corresponds to the port #b0, the antenna #1 corresponds to the port #b1, the antenna #2 corresponds to the port #b2, the antenna #3 corresponds to the port #b3, the antenna #4 corresponds to the port #b'0, the antenna #5 corresponds to the port #b'1, the antenna #6 corresponds to the port #b'2, and the antenna #7 corresponds to the port #b'3. In addition, in this embodiment of the present invention, when T=4, the terminal device can use only four antennas of the antenna #0 to the antenna #7 at a same moment to send PUSCHs, or in other words, at a same moment, the terminal device can send PUSCHs by using only four ports of the port #b0 to the port #b3 and the port #b'0 to the port #b'3. That is, when antenna (or port) switching is not performed, within one time unit, the terminal device can use only four antennas to send PUSCHs, or in other words, the terminal device can send PUSCHs by using only four ports.

As an example but not a limitation, in this embodiment of the present invention, the terminal device may further group the ports.

That is, optionally, the method 200 further includes: determining, by the terminal device, at least two first port groups, where each first port group includes at least one port that is used for the first channel or the first signal, and a quantity of ports included in each first port group is less than or equal to the maximum quantity T; determining, by the terminal device, at least two second port groups, where each second port group includes at least one port that is used for the second channel or the second signal, and a quantity of ports included in each second port group is less than or equal to the maximum quantity T; and obtaining, by the terminal device, mapping relationship information, where the mapping relationship information is used to indicate a one-to-one correspondence between the at least two first port groups and the at least two second port groups.

Specifically, the terminal device may group the ports used for the first channel, based on the maximum quantity T of ports usable at a same moment point by the terminal device during signal sending, to determine one or more first port groups, so that the quantity of ports included in each first port group is less than or equal to T.

In addition, the terminal device may group the ports used for the second channel, based on the maximum quantity T, so that the quantity of ports included in each second port group is less than or equal to T.

In addition, in this embodiment of the present invention, the quantities of ports included in the first port groups may be the same or may be different, and similarly, the quantities of ports included in the second port groups may be the same or may be different. This is not particularly limited in this embodiment of the present invention.

In addition, in this embodiment of the present invention, a quantity of first port groups may be the same as or different from a quantity of second port groups. This is not particularly limited in this embodiment of the present invention.

Optionally, in this embodiment of the present invention, the terminal device may make a port that is used for the first channel and that corresponds to one antenna belong to only one first port group, and the terminal device may make a port that is used for the second channel and that corresponds to one antenna belong to only one second port group; and, in a correspondence indicated by the mapping relationship information, a first port group to which a port that is used for the first channel or the first signal and that corresponds to one antenna belongs corresponds to a second port group to which a port that is used for the second channel or the second signal and that corresponds to the antenna belongs; or, in other words, in a correspondence indicated by the mapping relationship information, a first type of first port group corresponds to a first type of second port group, where the first type of first port group is a first port group to which a port that is used for the first channel and that corresponds to a first antenna of the at least two antennas belongs, and the first type of second port group is a second port group to which a port that is used for the second channel and that corresponds to the first antenna belongs.

Specifically, for example, the antenna #0 corresponds to the port #a0 and the port #b0. It is assumed that when SRS ports are grouped, a first port group into which the port #a0 is grouped is a first port group #0 (an example of the first type of first port group). It is assumed that when PUSCH ports are grouped, a second port group into which the port #b0 is grouped is a second port group #0 (an example of the first type of second port group). In this case, in the correspondence indicated by the mapping relationship information, the first port group #0 corresponds to the second port group #0.

Table 1 gives an example of the mapping relationship information.

TABLE 1

| Ports included in each first port group | Ports included in each second port group |
| --- | --- |
| Port #a0, port #a1, port #a2, and port #a3 | Port #b0, port #b1, port #b2, and port #b3 |
| Port #a4, port #a5, port #a6, and port #a7 | Port #b'0, port #b'1, port #b'2, and port #b'3 |

A first port group and a second port group that are in a same row in Table 1 correspond to each other.

In addition, optionally, the terminal device may further group a plurality of antennas, to determine at least two antenna groups. One antenna belongs to only one antenna group, the at least two antenna groups are in a one-to-one correspondence with at least two first port groups, the at least two antenna groups are in a one-to-one correspondence with at least two second port groups, and a first port group and a second port group that correspond to a same antenna group correspond to each other.

Table 2 gives another example of the mapping relationship information.

TABLE 2

| Ports included in each first port group | Ports included in each second port group | Antennas included in each antenna group |
|---|---|---|
| Port #a0, port #a1, port #a2, and port #a3 | Port #b0, port #b1, port #b2, and port #b3 | Antenna #0, antenna #1, antenna #2, and antenna #3 |
| Port #a4, port #a5, port #a6, and port #a7 | Port #b'0, port #b'1, port #b'2, and port #b'3 | Antenna #4, antenna #5, antenna #6, and antenna #7 |

A first port group and an antenna group that are in a same row in Table 2 correspond to each other, and a second port group and an antenna group that are in a same row in Table 2 correspond to each other.

In S210, the terminal device may determine, from the plurality of SRS ports, N ports (an example of the first ports) that are used within a subframe A (an example of the first time unit); in other words, the terminal device may determine N antennas that are used for SRS transmission within the subframe A, where $K>T≥N≥1$.

This means that the terminal device transmits, within the subframe A, SRSs of only some ports of the port #a0 to the port #a7.

In this embodiment of the present invention, the terminal device may determine the N first ports by itself.

For example, the terminal device may obtain a mapping rule that is specified in a communications protocol, entered by a user, or preset by an operator or a manufacturer. The mapping rule may indicate a correspondence between subframes and first port determining manners, so that the terminal device can determine, based on the mapping rule, a port used in each subframe for SRS transmission. For example, in a subframe whose subframe number is an odd number, the port #a0 to the port #a3 may be used as the first ports. For another example, in a subframe whose subframe number is an even number, the port #a4 to the port #a7 may be used as the first ports.

Alternatively, in this embodiment of the present invention, the network device may indicate the N first ports to the terminal device.

That is, optionally, the method further includes: receiving, by the terminal device, second indication information sent by the network device, where the second indication information is used to indicate the N first ports; and determining, by the terminal device, the N first ports based on the second indication information.

Specifically, in this embodiment of the present invention, the network device may determine the N first ports that are used by the terminal device for SRS transmission in the subframe A, and may deliver, to the terminal device, indication information that is used to indicate the N first ports (that is, the second indication information).

Optionally, the method further includes sending, by the terminal device, first indication information to the network device, where the first indication information is used to indicate the maximum quantity T of ports usable at a same moment by the terminal device during signal sending.

Specifically, in this embodiment of the present invention, the terminal device may further send to the network device, when, for example, being connected to the network device, indication information that is used to indicate the maximum quantity (a specific value of T) of ports usable at a same moment point by the terminal device (an example of the first indication information).

Therefore, the network device can learn of, based on the first indication information, the maximum quantity (the specific value of T) of ports usable at a same moment point by the terminal device.

In this way, the network device can determine the N first ports based on the first indication information. As an example but not a limitation, for example, the network device may determine the first ports based on the first indication information by making $N≤T$.

In addition, the first indication information may be further used to indicate a first port group (that is, a port group to which the N first ports belong, for example, the foregoing first port group #A); therefore, the terminal device can select the N first ports from the first port group indicated by the first indication information, and the N first ports may be all ports in the first port group indicated by the first indication information, or may be some ports in the first port group indicated by the first indication information. This is not particularly limited in this embodiment of the present invention.

As an example but not a limitation, the first indication information may be higher layer signaling, or the first indication information may be downlink control information (DCI). For example, in this embodiment of the present invention, the network device may determine a quantity of bits (bit) of the first indication information based on a quantity of first port groups, and determine the bits of the first indication information based on, for example, sequential location of the first port group indicated by the first indication information in the first port groups. For example, if the first ports are classified into two port groups, the first indication information may have one bit, for which "0" indicates a first port group to which the port a #0 to the port a #3 belong and "1" indicates a first port group to which the port a #4 and the port a #5 belong.

It should be understood that the above-enumerated specific form of the first indication information is merely used as an example for description. This embodiment of the present invention is not particularly limited thereto, provided that it is ensured that the network device and terminal device can determine a same first port group based on the first indication information.

It should be noted that when a plurality of SRS ports are classified into at least two first port groups, the first ports that are determined by the network device and those determined by the terminal device belong to a same first port group.

For ease of understanding and differentiation, without loss of generality, the following uses an example in which N=4 for description. In this case, without loss of generality, it is assumed that the N first ports are the port #a0 to the port #a3, or in other words, antennas corresponding to the N first ports are the antenna #0 to the antenna #3.

Then, the terminal device may determine, based on the N first ports determined above, from the plurality of PUSCH ports, M ports (an example of the second ports) that are used within the subframe A (an example of the first time unit); in other words, the terminal device may determine M antennas that are used for PUSCH transmission within the subframe A, where K>T≥N≥1.

This means that the terminal device transmits, within the subframe A, PUSCHs of only some ports of the port #b0 to the port #b3 and the port #b'0 to the port #b'3.

That is, the terminal device may determine the M second ports by using the following rule: when the terminal device transmits, within a same time unit, first channels (or first signals) of the N first ports and second channels (or second signals) of the M second ports, the terminal device does not need to perform antenna switching.

As an example but not a limitation, to satisfy the foregoing rule, in this embodiment of the present invention, the terminal device may determine the M second ports based on the N first ports in any one of the following manners.

For example, M antennas corresponding to the M second ports may belong to the N antennas corresponding to the N first ports.

For another example, the N antennas corresponding to the N first ports may belong to M antennas corresponding to the M second ports.

For another example, it is assumed that a quantity of same antennas in M antennas corresponding to the M second ports and the N antennas corresponding to the N first ports is P. In this case, the M antennas may make true: M+N−P≤T.

For another example, optionally, that the terminal device determines, based on N first ports that are used, within a first time unit, for a first channel, M second ports that correspond, within the first time unit, to a second channel includes: determining, by the terminal device, a target first port group from the at least two first port groups, where the N first ports belong to a same port group, and the target first port group includes the N first ports; determining, by the terminal device, based on the mapping relationship information, a target second port group corresponding to the target first port group from the at least two second port groups; and determining, by the terminal device, the M second ports from the target second port group.

Specifically, when the N first ports belong to a same first port group (an example of the first type of first port group, denoted as a first port group #A for ease of understanding and description), the terminal device may further determine, based on the mapping relationship information (for example, Table 1 or Table 2), a second port group (an example of the first type of second port group, denoted as a second port group #A) corresponding to the first port group #A. As described above, one antenna belongs to only one antenna group, at least two antenna groups are in a one-to-one correspondence with at least two first port groups, the at least two antenna groups are in a one-to-one correspondence with at least two second port groups, and a first port group and a second port group that correspond to a same antenna group correspond to each other. Therefore, when the terminal device transmits, within a same time unit, first channels (or first signals) of ports in the first port group #A and second channels (or second signals) of ports in the second port group #A, the terminal device does not need to perform antenna switching.

After that, the terminal device may select M ports from the second port group #A, as the second ports.

As an example but not a limitation, the second ports may be all ports in the second port group #A, or the second ports may be some ports in the second port group #A. This is not particularly limited in this embodiment of the present invention.

It should be noted that, in this embodiment of the present invention, a specific value of N may be randomly set as required, and this is not particularly limited in this embodiment of the present invention. For example, when the first signal (or a signal transmitted by the first channel) is an SRS, the specific value of N may be determined by the terminal device based on a quantity of antennas used for downlink transmission. In addition, a specific value of M may be randomly set as required, and this is not particularly limited in this embodiment of the present invention. For example, when the second channel (or a channel used to transmit the second channel) is a PUSCH, the specific value of N may be determined by the terminal device based on a channel state of an uplink channel.

FIG. 4 shows an example of a transmission mode for SRSs and PUSCHs according to an embodiment of the present invention. As shown in FIG. 4, in a subframe A (an example of a first time unit), SRSs (an example of a first signal) correspond to a port #a0 to a port #a3 (an example of N first ports), and PUSCHs (an example of a second channel) correspond to a port #b0 to a port #b3 (an example of M second ports). The above-determined quantity (that is, 4) of antennas corresponding to the port #a0 to the port #a3 and the port #b0 to the port #b3 is less than or equal to T; therefore, within the subframe A, a terminal device does not need to perform antenna switching for sending of the SRSs and the PUSCHs.

In addition, as shown in FIG. 4, in a subframe B (an example of the first time unit), SRSs (another example of the first signal) correspond to a port #a4 to a port #a7 (another example of the N first ports), and PUSCHs (another example of the second channel) correspond to a port #b'0 to a port #b'3 (another example of the M second ports). The above-determined quantity (that is, 4) of antennas corresponding to the port #a4 to the #a7 and the port #b'0 to the port #b'3 is less than or equal to T; therefore, within the subframe B, the terminal device does not need to perform antenna switching for sending of the SRSs and the PUSCHs.

In this embodiment of the present invention, within a same time unit (for example, one subframe), physical antennas for PUSCHs are the same as those for SRSs; therefore, within the time unit, antenna (or antenna port) switching does not need to be performed, and antenna port switching may need to be performed only before the PUSCHs. In this case, if the PUSCHs are at a junction of a downlink subframe and an uplink subframe, a switching time may overlap a downlink-to-uplink switching time, and no additional antenna switching time is required. Alternatively, if the PUSCHs are between two uplink subframes, a $1^{st}$ symbol for PUSCHs may be allowed to be affected by multipath interference. In this case, some loss of PUSCH performance may result. However, because a PUSCH is jointly encoded, the loss is limited, and therefore no additional antenna switching time is required. In conclusion, according to the wireless communication method in this embodiment of the present invention, an antenna switching time is not required either before a time unit or within a time unit.

It should be noted that, this solution is not limited to PUSCHs and SRSs, or limited to LTE-like frame structures, or limited in quantities of symbols of channels, or a sequence of channels, or a quantity of ports. A key point is a correspondence between different channel port groups.

Figure 5:
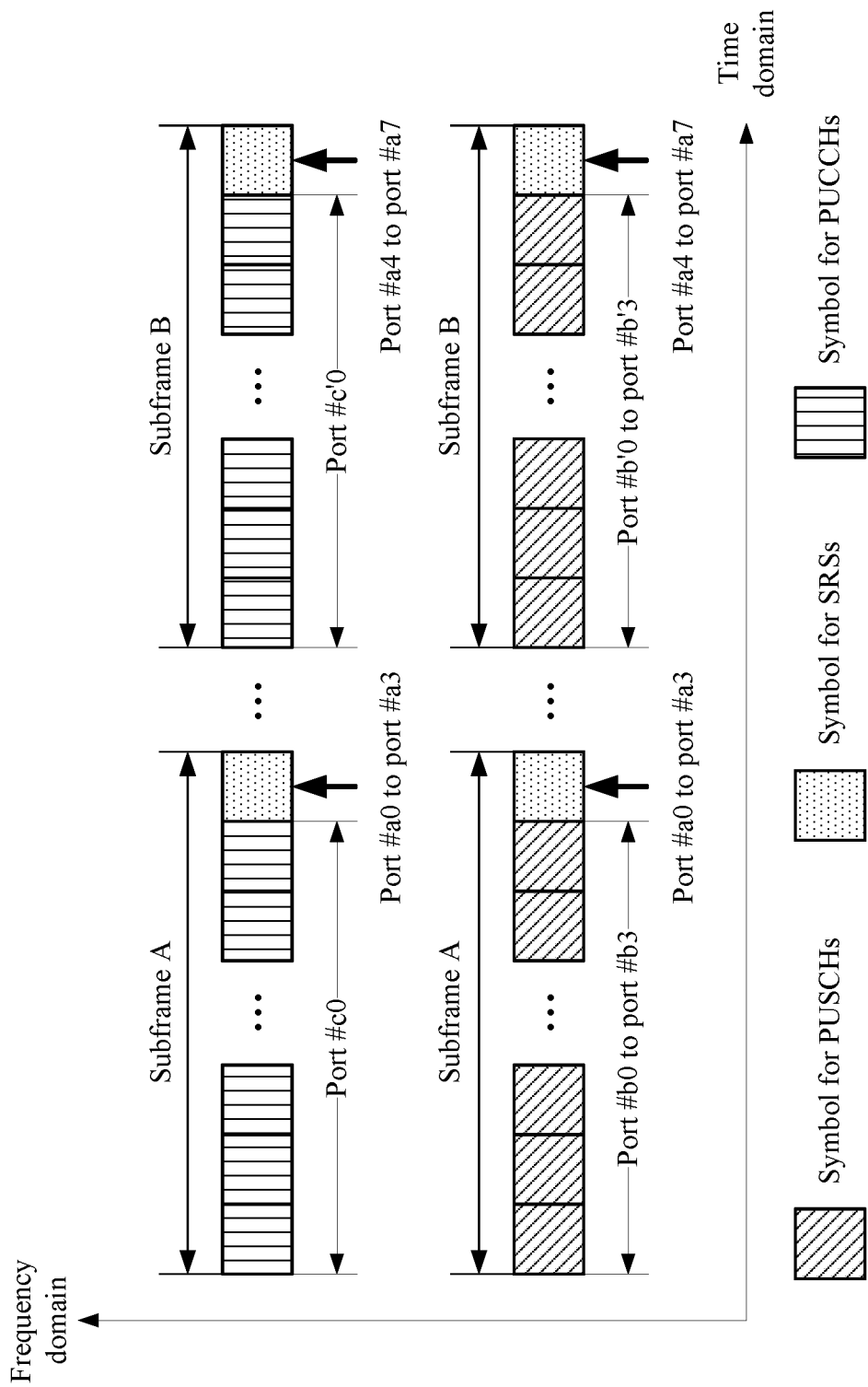
FIG. 5 is a schematic diagram of an example of a transmission mode for SRSs, PUSCHs, and PUCCHs according to an embodiment of the present invention.
Figure 6:
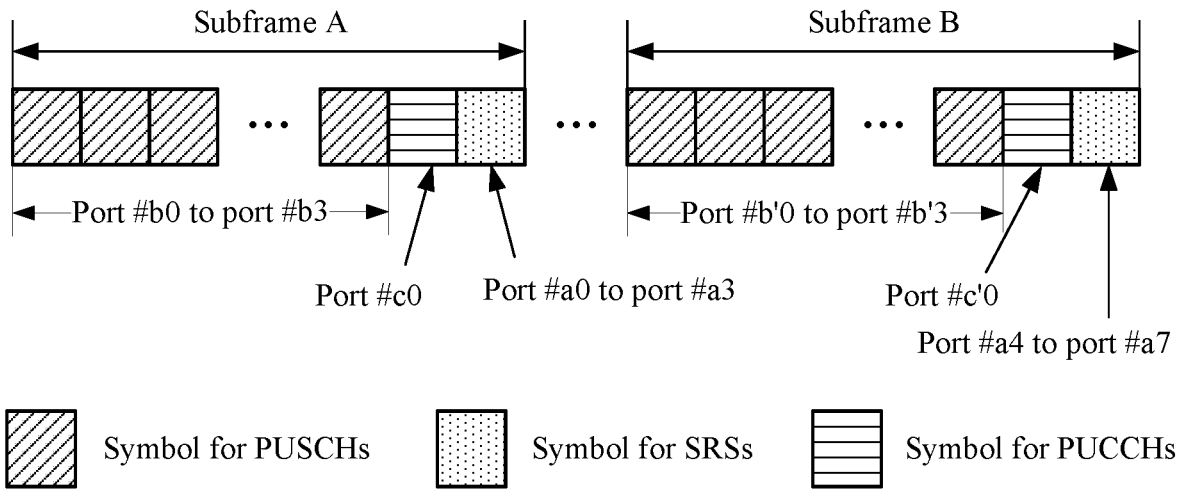
FIG. 6 is a schematic diagram of another example of a transmission mode for SRSs, PUSCHs, and PUCCHs according to an embodiment of the present invention.
Figure 7:
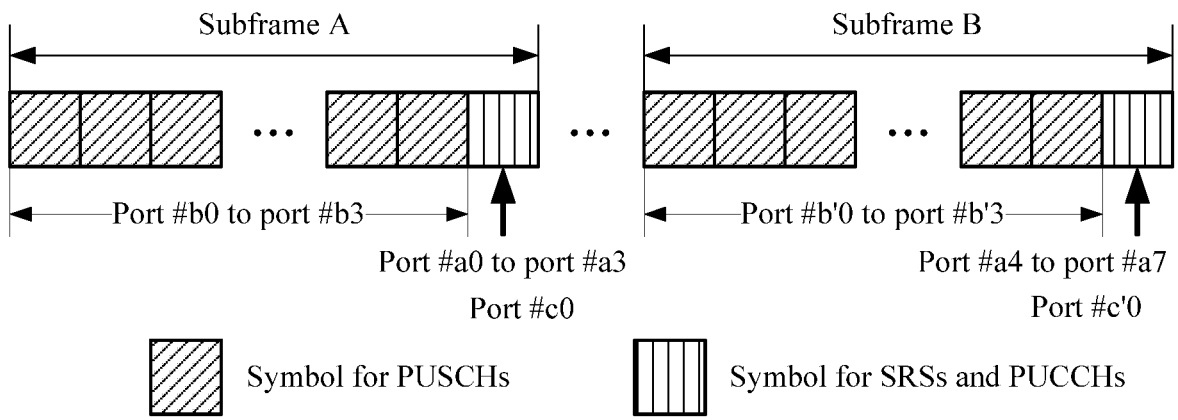
FIG. 7 is a schematic diagram of another example of a transmission mode for SRSs, PUSCHs, and PUCCHs according to an embodiment of the present invention.

FIG. 5, FIG. 6, and FIG. 7 each show an example of a transmission mode for SRSs, PUSCHs, and PUCCHs according to an embodiment of the present invention. As shown in FIG. 5, FIG. 6, or FIG. 7, in a subframe A (an example of the first time unit), SRSs (an example of the first signal) correspond to a port #a0 to a port #a3 (an example of the N first ports), PUSCHs (an example of the second channel) correspond to a port #b0 to a port #b3 (an example of the M second ports), and PUCCHs (another example of the second channel) corresponds to a port #c0 (another example of the M second ports, for example, the port #c0 may correspond to an antenna #0). The above-determined quantity (that is, 4) of antennas corresponding to the port #a0 to the port #a3, the port #b0 to the port #b3, and the port #c0 is less than or equal to T; therefore, within the subframe A, a terminal device does not need to perform antenna switching for sending of the SRSs and the PUSCHs.

In addition, as shown in FIG. 5, FIG. 6, or FIG. 7, in a subframe B (an example of the first time unit), SRSs (another example of the first signal) correspond to a port #a4 to a port #a7 (another example of the N first ports), PUSCHs (another example of the second channel) correspond to a port #b'0 to a port #b'3 (another example of the M second ports), and PUCCHs (another example of the second channel) corresponds to a port #'c (another example of the M second ports, for example, the port #c'0 may correspond to an antenna #4). The above-determined quantity (that is, 4) of antennas corresponding to the port #a4 to the port #a7, the port #b'0 to the port #b'3, and the port #c'0 is less than or equal to T; therefore, within the subframe B, the terminal device does not need to perform antenna switching for sending of the SRSs and the PUSCHs.

In addition, a difference between FIG. 5, FIG. 6, and FIG. 7 lies in that, in the example shown in FIG. 5, PUSCHs and PUCCHs are transmitted in a frequency division multiplexing manner, in the example shown in FIG. 6, PUSCHs and PUCCHs are transmitted in a time division multiplexing manner, in the example shown in FIG. 7, PUSCHs and PUCCHs are transmitted in the time division multiplexing manner, and in the example shown in FIG. 7, PUCCHs and SRSs are transmitted by using a same symbol.

In S220, the terminal device may send the first channel or the first signal based on the first ports determined above, and send the second channel or the second signal based on the second ports determined above.

As an example but not a limitation, in this embodiment of the present invention, the terminal device may send the first channel or the first signal and the second signal or the second signal in the following two manners:

Manner 1

Optionally, that the terminal device sends, within the first time unit, the first channel or the first signal by using the N first ports, and the terminal device sends, within the first time unit, the second channel or the second signal by using the M second ports include sending, by the terminal device, within a first time period of the first time unit, the first channel or the first signal by using the N first ports, and sending, by the terminal device, within a second time period of the first time unit, the second channel or the second signal by using the M second ports.

Specifically, in this embodiment of the present invention, the terminal device may send the first channel and the second channel in different time periods (for example, different symbols) within the first time unit (for example, one uplink subframe) in a time division multiplexing manner.

Manner 2

Optionally, that the terminal device sends, within the first time unit, the first channel or the first signal by using the N first ports, and the terminal device sends, within the first time unit, the second channel or the second signal by using the M second ports includes sending, by the terminal device, within the first time unit, the first channel or the first signal on a first frequency band by using the N first ports, and the second channel or the second signal on a second frequency band by using the M second ports.

Specifically, in this embodiment of the present invention, the terminal device may send the first channel and the second channel in different frequency bands (for example, different carriers) within the first time unit (for example, one uplink subframe) in a frequency division multiplexing manner.

It should be understood that the above enumerated manner 1 and manner 2 may be used separately or may be used in combination. This is not particularly limited in this embodiment of the present invention.

Optionally, the method further includes receiving, by the terminal device, signaling that is sent by the network device and that is for the second channel or the second signal, where the signaling is determined by the network device based on the M second ports, wherein sending, by the terminal device, within the first time unit, the second channel or the second signal by using the M second ports includes sending, by the terminal device, within the first time unit, the second channel or the second signal based on the signaling by using the M second ports.

Specifically, in this embodiment of the present invention, before the terminal device transmits the second channel or the second signal (for example, a PUSCH and/or a PUCCH), the terminal device may further receive the signaling (or configuration information or scheduling information) that is sent by the network device and that is for the second channel or the second channel. The signaling may indicate a transmission parameter used when the second channel or the second signal (for example, a PUSCH and/or a PUCCH) is transmitted. As an example but not a limitation, the transmission parameter may include one or more of the following parameters:

A. Waveform Parameter

The waveform parameter, or a parameter of a waveform, is a parameter that is capable of indicating or determining a waveform.

As an example but not a limitation, in this embodiment of the present invention, the waveform parameter may include at least one of the following parameters:

A1. A waveform parameter used in an orthogonal frequency division multiplexing (OFDM) technology;

A2. A waveform parameter used in single-carrier frequency-division multiple access (SC-OFDM);

A3. A waveform parameter used in a filter orthogonal frequency division multiplexing (filter OFDM) technology;

A4. A waveform parameter used in a universal filtered multi-carrier (UFMC) technology;

A5. A waveform parameter used in a filter bank multi-carrier (FBMC) technology; and A6. A waveform parameter used in a generalized frequency division multiplexing (GFDM) technology.

B. Modulation Scheme

In communications technologies, to ensure a communication effect and overcome a problem in long-range signal transmission, a signal spectrum needs to be moved, through modulation, to a high frequency channel for transmission. This process of loading a to-be-sent signal to a high frequency signal is called modulation. As an example but not a limitation, in this embodiment of the present invention, the modulation scheme may include at least one of the following schemes:

B1. Amplitude shift keying (ASK) modulation;
B2. Phase shift keying (PSK) modulation;
B3. Frequency shift keying (FSK) modulation;
B4. Quadrature amplitude modulation (QAM);
B5. Minimum shift keying (MSK) modulation;
B6. Gaussian filtered minimum shift keying (GMSK) modulation; and
B7. OFDM modulation.

C. Bandwidth Configuration

In this embodiment of the present invention, the bandwidth configuration may be a used width of frequency domain resources that is required by an air interface. As an example but not a limitation, a bandwidth configuration corresponding to a wideband transmission service may be a minimum frequency domain resource width, or a minimum quantity of subcarriers, required by an air interface; and a bandwidth configuration corresponding to a narrowband transmission service may be a maximum frequency domain resource width, or a maximum quantity of subcarriers, required by an air interface.

D. Radio Frame Configuration Mode

D1. Subcarrier spacing;
D2. Symbol duration;
D3. Cyclic prefix (CP);
D4. Duplex mode: For example, the duplex mode may be a full-duplex mode, a half-duplex mode (including a half-duplex uplink-downlink configuration), or a flexible duplex mode. It should be noted that, for some air interfaces, the duplex mode may be fixed or may be flexible, and this is not particularly limited in this embodiment of the present invention;
D5. Transmission time interval (TTI): It should be noted that, for some air interfaces, the transmission time interval may be a fixed value or may be changed flexibly, and this is not particularly limited in this embodiment of the present invention; and
D6. Radio frame duration and radio subframe duration.

E. Resource Multiplexing Manner

As an example but not a limitation, in this embodiment of the present invention, the resource multiplexing scheme may include at least one of the following manners:

E1. Frequency division multiplexing (FDM): Total bandwidth used for channel transmission is divided into several frequency sub-bands (or referred to as sub-channels), where each sub-channel transmits one signal. Frequency division multiplexing requires that a total frequency width be greater than a sum of frequencies of the sub-channels. In addition, to avoid mutual interference between signals transmitted in the sub-channels, an isolation band needs to be set between the sub-channels. In this way, mutual interference between signals is avoided (one condition).

E2. Time division multiplexing (TDM): A same physical connection is used to transmit different signals in different time periods, so that multiple lines of transmission can also be achieved. In time division multiplexing, time is used as a parameter for signal separation, and therefore it is required that signals do not overlap each other in a time line. Time division multiplexing means that time provided for a channel to transmit information is divided into several time segments (timeslots for short) and these timeslots are allocated to signal sources for use.

E3. Space division multiplexing (SDM): A same frequency band is used repetitively in different spaces. In mobile communications, a basic technology that can implement space division is forming different beams in different user directions by using an adaptive array antenna. In addition, space division may be used to differentiate different users, or each beam may provide one channel that is not interfered with by another user, or space division may be used to differentiate different data of a same user, or space division may be used to differentiate same data of a same user, so as to achieve a better gain.

E4. Code division multiplexing (CDM): a multiplexing manner in which different codes are used to differentiate original signals. As an example but not a limitation, code division multiple access (CDMA), frequency division multiple access (FDMA), time division multiple access (TDMA), and synchronous code division multiple access (SCDMA) may be enumerated.

H. Coding Scheme

Coding is a transformation performed on source symbols with a purpose of improving communication effectiveness. Specifically, coding means finding a method based on a statistic characteristic of a source output symbol sequence, to transform the source output symbol sequence into a shortest codeword sequence, so that an average information amount loaded by elements of the shortest codeword sequence is the largest, ensuring that the original symbol sequence can be restored without distortion.

As an example but not a limitation, in this embodiment of the present invention, enumerable coding schemes are as follows:

H1. Polar code
H2. Turbo code
H3. Convolution code

I. Protocol Stack Configuration Mode

A protocol stack is a sum of all layers of protocols on a network. The protocol stack vividly reflects a file transmission process on a network: from an upper layer protocol to a bottom layer protocol, and then from the bottom layer protocol to the upper layer protocol. As an example but not a limitation, in this embodiment of the present invention, a protocol stack used in wireless communications may include at least one protocol layer or a combination of a plurality of protocol layers of the following protocol layers, and each protocol layer may have a plurality of protocol entities:

I1. Packet Data Convergence Protocol (PDCP) layer
I2. Radio Link Control (RLC) layer
I3. Media Access Control (MAC) layer
I4. Physical layer
I5. Radio Resource Control (RRC) layer J. Multiple Access Mode Different from multiplexing, a multiple access technology does not require that all information gather together, and instead, the information is modulated separately to a channel and required information obtained through modulation is obtained separately from a channel. As an example but not a limitation, in this embodiment of the present invention, the multiple access mode used in wireless communications may include at least one of the following modes:

J1. FDMA
J2. TDMA
J3. CDMA
J4. SCMA
J5. Non orthogonal multiple access (NOMA)
J6. Multi-user shared access (MUSA)

It should be understood that the above-enumerated specific content included in the signaling that is for the second channel or the second signal is merely examples for description, and this embodiment of the present invention is not limited thereto. Any other prior-art parameter or information that can be determined in the network device and the terminal device in a pre-specified manner shall fall within the protection scope of this embodiment of the present invention.

In this embodiment of the present invention, the network device may determine the second ports based on the first ports. This process may be similar to the above-described process of determining the second ports by the terminal device based on the first ports. Herein, to avoid repetition, detailed descriptions thereof are omitted.

Then, the network device may determine, based on the second ports, the second channel (for example, a PUSCH and/or a PUCCH) within the first time unit, so as to determine a channel state (for example, channel quality) of the second channel (for example, a PUSCH and/or a PUCCH). In this way, the network device may determine, based on the channel state of the second channel (for example, a PUSCH and/or a PUCCH), the signaling (or the transmission parameter) that is for the second channel or the second signal.

As an example but not a limitation, for example, if the channel quality of the second channel (for example, a PUSCH and/or a PUCCH) within the first time unit is relatively poor, the network device may configure a relatively low modulation order.

In this way, the terminal device may determine, based on the signaling (or the transmission parameter) that is for the second channel or the second signal, a configuration parameter of the second channel (for example, a PUSCH and/or a PUCCH) within the first time unit, so as to transmit, within the first time unit, the second channel (for example, a PUSCH and/or a PUCCH) based on the configuration parameter.

According to the wireless communication method in this embodiment of the present invention, a plurality of optional ports for PUSCHs are provided; therefore, a PUSCH transmission parameter may be adaptively changed based on a selected port. In this way, performance of the wireless communication method in this embodiment of the present invention can be further improved.

Optionally, there is a preset guard interval before the first time period and/or the second time period.

Figure 8:
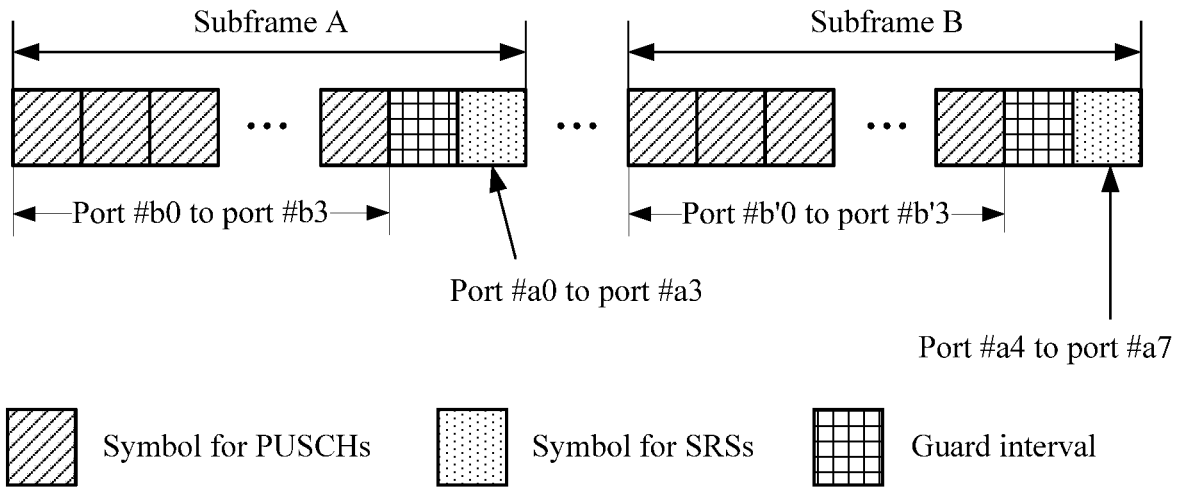
FIG. 8 is a schematic diagram of another example of a transmission mode for SRSs and PUSCHs according to an embodiment of the present invention.

Specifically, for example, FIG. 8 shows an example of a transmission mode for SRSs (an example of the first channel) and PUSCHs (an example of the second channel) according to an embodiment of the present invention. As shown in FIG. 8, a time interval (an example of the guard interval) may be set between the SRSs and the PUSCHs. In addition, the time interval may correspond to a time of channel switching performed when the terminal device transmits SRSs and PUSCHs by using a same antenna. For example, the time interval is greater than or equal to the channel switching time. In this way, reliability of wireless communication in this embodiment of the present invention can be further improved.

Figure 9:
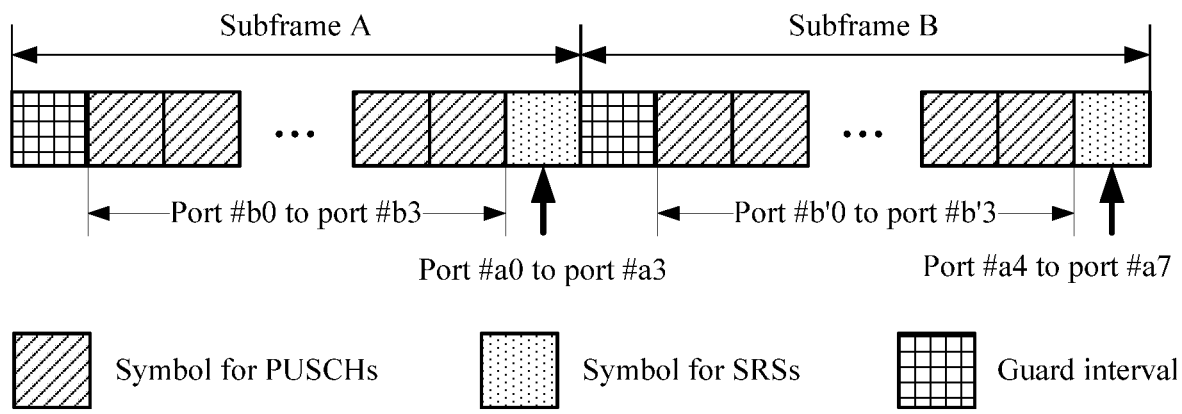
FIG. 9 is a schematic diagram of another example of a transmission mode for PUSCHs according to an embodiment of the present invention.

For another example, FIG. 9 shows an example of a transmission mode for PUSCHs (the first channel or the second channel) according to an embodiment of the present invention. As shown in FIG. 9, if the PUSCHs are at a start location of an uplink subframe, it is possible that the PUSCHs be between two uplink subframes. In this case, a time interval (an example of the guard interval) may be set before the PUSCHs. In this way, the PUSCHs (specifically, a $1^{st}$ symbol for PUSCHs) may be prevented from being affected by antenna switching, and reliability of wireless communication in this embodiment of the present invention can be further improved.

According to the wireless communication method in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved.

In addition, in another implementation of this embodiment of the present invention, alternatively, the ports used for the first channel or the first signal may be determined in a prior-art manner, and the ports used for the second channel or the second signal may also be determined in a prior-art manner. For example, the ports used for the second channel or the second signal may be determined not based on the ports used for the first channel or the first signal. In this case, the first channel or the first signal and the second channel or the second signal are sent in different time periods of a same time unit. For example, the first channel or the first signal is transmitted in a time period #1, and the second channel or the second signal is transmitted in a time period #2. In this case, a guard interval may be set between the time period #1 and the time period #2. In addition, the guard interval may correspond to duration required for the terminal device to perform transmit antenna switching. For example, the guard interval may be greater than or equal to the duration required for the terminal device to perform transmit antenna switching. In this way, reliability and accuracy of transmission can be improved.

In addition, it is assumed that in two adjacent time units, an antenna corresponding to a last channel or signal borne in a last symbol of a time unit for earlier sending in timing is a first antenna, and that an antenna corresponding to a $1^{st}$ channel or signal borne in a time unit for later sending in timing is a second antenna. Then, it is possible that the first antenna be different from the second antenna. In this case, in this embodiment of the present invention, a guard interval may be set before a $1^{st}$ channel or signal of each time unit. In addition, the guard interval may correspond to the duration required for the terminal device to perform transmit antenna switching. For example, the guard interval may be greater than or equal to the duration required for the terminal device to perform transmit antenna switching. In this way, reliability and accuracy of transmission can be improved.

Figure 10:
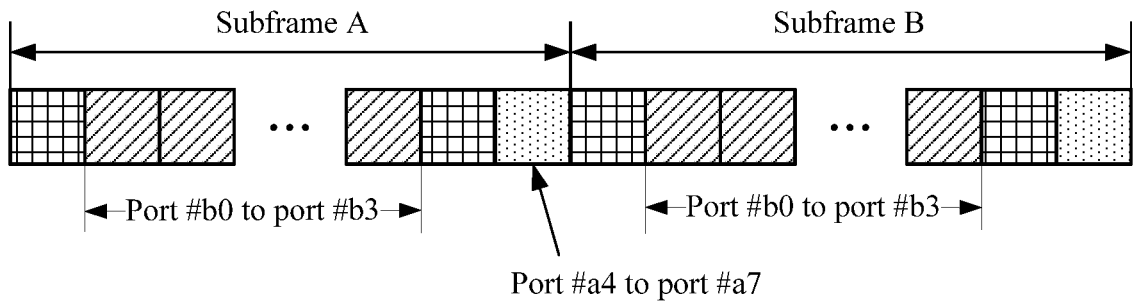
FIG. 10 is a schematic diagram of another example of a transmission mode for SRSs and PUSCHs according to an embodiment of the present invention.
Figure 11:
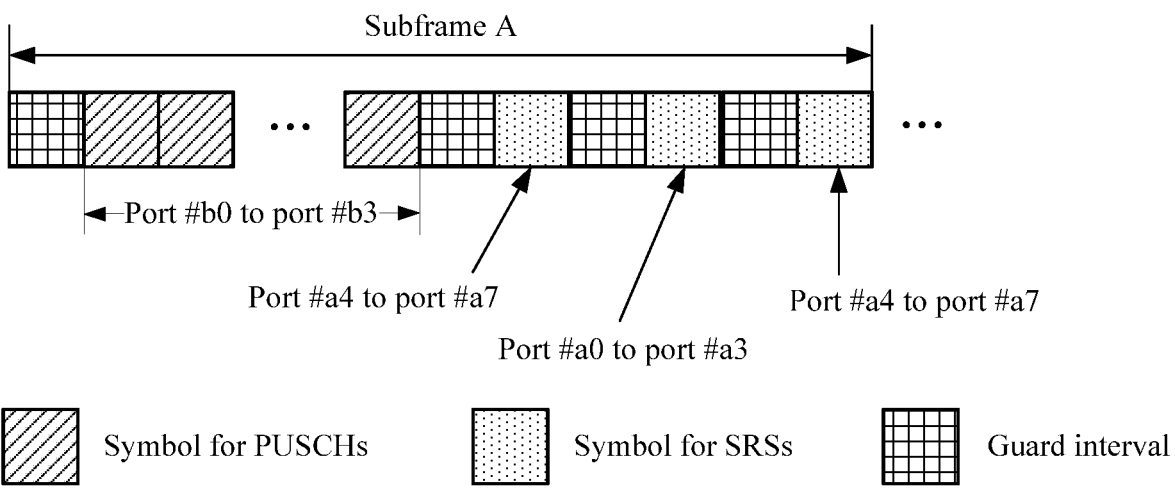
FIG. 11 is a schematic diagram of another example of a transmission mode for SRSs and PUSCHs according to an embodiment of the present invention.
Figure 12:
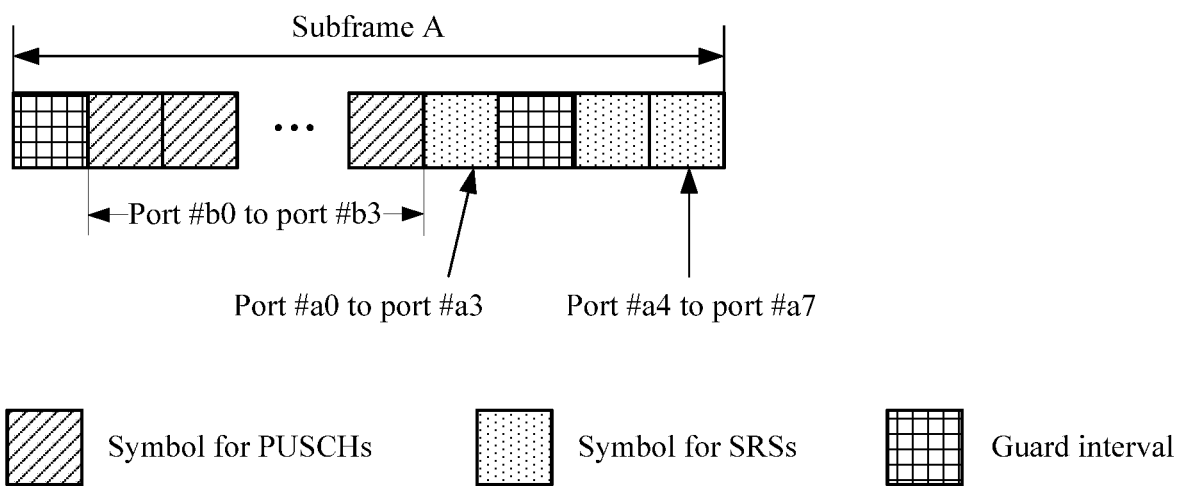
FIG. 12 is a schematic diagram of another example of a transmission mode for SRSs and PUSCHs according to an embodiment of the present invention.

FIG. 10 to FIG. 12 are schematic diagrams of a guard interval setting manner according to the embodiments of the present invention.

As shown in FIG. 10, a guard interval is set between a symbol for PUSCHs (an example of the first channel or the first signal) and a symbol for SRSs (an example of the second channel or the second signal), and only a port #b0 to a port #b3 are used for PUSCHs in each subframe. In this way, in a subframe A, ports for PUSCHs and ports for SRSs correspond to same antennas. In a subframe B, ports for PUSCHs and ports for SRSs correspond to different antennas. However, because the guard interval is set, in the subframe B, a transmission interval between the PUSCHs and the SRSs can satisfy the duration required for antenna switching. In this way, transmission reliability and accuracy of the PUSCHs and the SRSs can be ensured. In addition, SRSs in the subframe A and PUSCHs in the subframe B correspond to different antennas. However, because the guard interval is set before the PUSCHs in the subframe B; therefore, a transmission interval between the SRSs in the subframe A and the PUSCHs in the subframe B can satisfy the duration required for antenna switching. In this way, transmission reliability and accuracy of the PUSCHs and the SRSs can be ensured.

As shown in FIG. 11 or FIG. 12, in one subframe, ports for adjacent SRSs correspond to different antennas. In this case, a guard interval may be set between adjacent SRS symbols that correspond to different ports. In this way, transmission reliability and accuracy of the SRSs can be ensured.

In addition, as shown in FIG. 12, when the ports for PUSCHs and the ports for SRSs correspond to a same antenna, the guard interval may not be set between the PUSCHs and the SRSs.

FIG. 13 is a schematic flowchart of a wireless communication method 300 described from a perspective of a network device. As shown in FIG. 13, the method 300 includes the following steps.

S310. The network device determines, based on N first ports that are used, within a first time unit, for a first channel or a first signal of a terminal device, M second ports that are used, within the first time unit, for a second channel or a second signal of the terminal device, where T≥N≥1, T≥M≥1, and T is a maximum quantity of ports usable at a same moment by the terminal device during signal sending.

S320. The network device determines, based on the M second ports, signaling that is for the second channel or the second signal.

S330. The network device sends the signaling to the terminal device.

S340. The network device receives, within the first time unit, the first channel or the first signal sent by the terminal device, and the second channel or the second signal sent by the terminal device, where the first channel or the first signal is sent by the terminal device by using the N first ports, and the second channel or the second signal is sent by the terminal device based on the signaling by using the M second ports.

Optionally, the method further includes: determining, by the network device, at least two first port groups, where each first port group includes at least one port, of the terminal device, used for the first channel or the first signal, and a quantity of ports included in each first port group is less than or equal to the maximum quantity T; determining, by the network device, at least two second port groups, where each second port group includes at least one port, of the terminal device, used for the second channel or the second signal, and a quantity of ports included in each second port group is less than or equal to the maximum quantity T; obtaining, by the terminal device, mapping relationship information, where the mapping relationship information is used to indicate a one-to-one correspondence between the at least two first port groups and the at least two second port groups, wherein determining, by a network device, based on N first ports that are used, within a first time unit, for a first channel or a first signal of a terminal device, M second ports that are used, within the first time unit, for a second channel or a second signal of the terminal device includes: determining, by the network device, a target first port group from the at least two first port groups, where the N first ports belong to a same port group, and the target first port group includes the N first ports; determining, by the network device, based on the mapping relationship information, a target second port group corresponding to the target first port group from the at least two second port groups; and determining, by the network device, the M second ports from the target second port group.

Optionally, the method further includes receiving, by the network device, first indication information sent by the terminal device, where the first indication information is used to indicate the maximum quantity T of ports usable at a same moment by the terminal device during channel or signal sending; and determining, by the network device, the maximum quantity T based on the first indication information.

Optionally, the method further includes sending, by the network device, second indication information to the terminal device, where the second indication information is used to indicate the N first ports.

Optionally, receiving, by the network device, within the first time unit, the first channel or the first signal sent by the terminal device, and the second channel or the second signal sent by the terminal device includes receiving, by the network device, within a first time period of the first time unit, the first channel or the first signal, and receiving, by the network device, within a second time period of the first time unit, the second channel or the second signal.

Optionally, there is a preset guard interval before the first time period and/or the second time period.

Optionally, receiving, by the network device, within the first time unit, the first channel or the first signal sent by the terminal device, and the second channel or the second signal sent by the terminal device includes receiving, by the network device, within the first time unit, the first channel or the first signal on a first frequency band, and the second channel or the second signal on a second frequency band.

Optionally, the first signal is a sounding reference signal SRS, and the second channel is a physical uplink data channel PUSCH or a physical uplink control channel PUCCH; or the first channel is a PUSCH or a PUCCH, and the second signal is an SRS.

Optionally, one time unit includes at least one subframe; or one time unit includes at least one timeslot; or one time unit includes at least two symbols.

The actions of the network device in the method 300 are similar to the actions of the network device in the method 200, and the actions of the terminal device in the method 300 are similar to the actions of the terminal device in the method 200. Herein, to avoid repetition, detailed descriptions thereof are omitted.

According to the wireless communication method in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved. In addition, by making the network device determine, based on the M second ports, the signaling used to indicate a configuration parameter that is used when the terminal device sends the second channel or the second signal, and by making the network device send the signaling to the terminal device, transmission accuracy and reliability of the second channel or the second signal can be improved, and communication performance is further improved.

Figure 14:
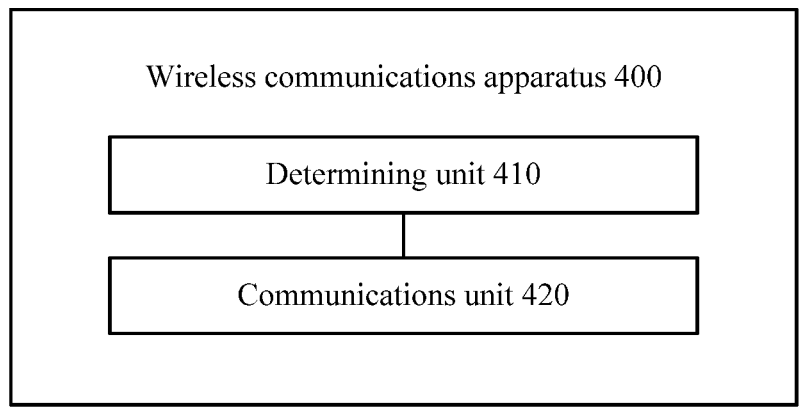
FIG. 14 is a schematic block diagram of a wireless communications apparatus according to one of the embodiments of the present invention.
Figure 15:
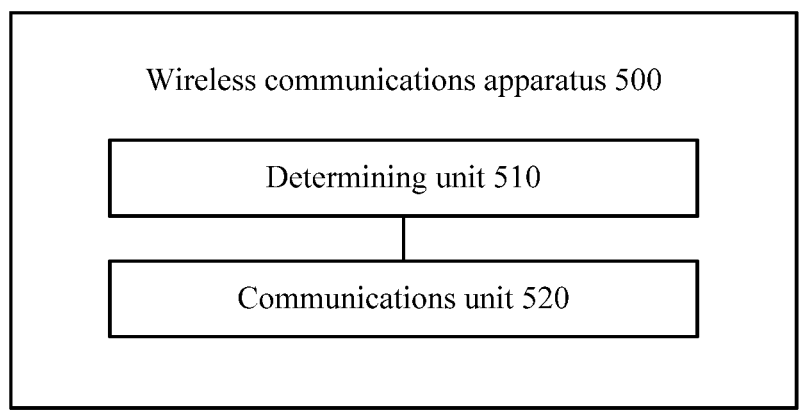
FIG. 15 is a schematic block diagram of a wireless communications apparatus according to another one of the embodiments of the present invention.

With reference to FIG. 1 to FIG. 13, the foregoing describes the wireless communication methods according to the embodiments of the present invention in detail. With reference to FIG. 14 and FIG. 15, the following describes wireless communications apparatuses according to the embodiments of the present invention in detail.

FIG. 14 is a schematic block diagram of a wireless communications apparatus 400 according to an embodiment of the present invention. As shown in FIG. 14, the apparatus 400 includes: a determining unit 410, configured to determine, based on N first ports that are used, within a first time unit, for a first channel or a first signal, M second ports that are used, within the first time unit, for a second channel or a second signal, where T≥N≥1, T≥M≥1, and T is a maximum quantity of ports usable at a same moment by the terminal device during signal sending; and a communications unit 420, configured to: send, within the first time unit, the first channel or the first signal by using the N first ports, and send, within the first time unit, the second channel or the second signal by using the M second ports.

Optionally, the determining unit is configured to: determine at least two first port groups, where each first port group includes at least one port that is used for the first channel or the first signal, and a quantity of ports included in each first port group is less than or equal to the maximum quantity T; determine at least two second port groups, where each second port group includes at least one port that is used for the second channel or the second signal, and a quantity of ports included in each second port group is less than or equal to the maximum quantity T; obtain mapping relationship information, where the mapping relationship information is used to indicate a one-to-one correspondence between the at least two first port groups and the at least two second port groups; determine a target first port group from the at least two first port groups, where the N first ports belong to a same port group, and the target first port group includes the N first ports; determine, based on the mapping relationship information, a target second port group corresponding to the target first port group from the at least two second port groups; and determine the M second ports from the target second port group.

Optionally, the communications unit is configured to: receive signaling that is sent by a network device and that is for the second channel or the second signal, where the signaling is determined by the network device based on the M second ports; and send, within the first time unit, the second channel or the second signal based on the signaling by using the M second ports.

Optionally, the communications unit is configured to send first indication information to the network device, where the first indication information is used to indicate the maximum quantity T of ports usable at a same moment by the terminal device during channel or signal sending.

Optionally, the communications unit is configured to receive second indication information sent by the network device, where the second indication information is used to indicate the N first ports; and the determining unit is configured to determine the N first ports based on the second indication information.

Optionally, the communications unit is configured to: send, within a first time period of the first time unit, the first channel or the first signal by using the N first ports, and send, within a second time period of the first time unit, the second channel or the second signal by using the M second ports.

Optionally, there is a preset guard interval before the first time period and/or the second time period.

Optionally, the communications unit is configured to send, within the first time unit, the first channel or the first signal on a first frequency band by using the N first ports, and the second channel or the second signal on a second frequency band by using the M second ports.

Optionally, the first signal is a sounding reference signal SRS, and the second channel is a physical uplink data channel PUSCH or a physical uplink control channel PUCCH; or the first channel is a PUSCH or a PUCCH, and the second signal is an SRS.

Optionally, one time unit includes at least one subframe; or one time unit includes at least one timeslot; or one time unit includes at least two symbols.

The wireless communications apparatus 400 according to this embodiment of the present invention may correspond to the terminal device in the methods in the embodiments of the present invention. In addition, the units, or modules, and the foregoing other operations and/or functions of the wireless communications apparatus 400 are intended to implement the corresponding procedures of the method 200 in FIG. 3. For brevity, details are not repeatedly described herein.

According to the wireless communications apparatus in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved.

FIG. 15 is a schematic block diagram of a wireless communications apparatus 500 according to an embodiment of the present invention. As shown in FIG. 15, the apparatus 500 includes: a determining unit 510, configured to: determine, based on N first ports that are used, within a first time unit, for a first channel or a first signal of a terminal device, M second ports that are used, within the first time unit, for a second channel or a second signal of the terminal device, where T≥N≥1, T≥M≥1, and T is a maximum quantity of ports usable at a same moment by the terminal device during signal sending; and determine, based on the M second ports, signaling that is for the second channel or the second signal; and a communications unit 520, configured to: send the signaling to the terminal device; and receive, within the first time unit, the first channel or the first signal sent by the terminal device, and the second channel or the second signal sent by the terminal device, where the first channel or the first signal is sent by the terminal device by using the N first ports, and the second channel or the second signal is sent by the terminal device based on the signaling by using the M second ports.

Optionally, the determining unit is configured to: determine at least two first port groups, where each first port group includes at least one port, of the terminal device, used for the first channel or the first signal, and a quantity of ports included in each first port group is less than or equal to the maximum quantity T; determine at least two second port groups, where each second port group includes at least one port, of the terminal device, used for the second channel or the second signal, and a quantity of ports included in each second port group is less than or equal to the maximum quantity T; obtain mapping relationship information, where the mapping relationship information is used to indicate a one-to-one correspondence between the at least two first port groups and the at least two second port groups; determine a target first port group from the at least two first port groups, where the N first ports belong to a same port group, and the target first port group includes the N first ports; determine, based on the mapping relationship information, a target second port group corresponding to the target first port group from the at least two second port groups; and determine the M second ports from the target second port group.

Optionally, the communications unit is configured to receive first indication information sent by the terminal device, where the first indication information is used to indicate the maximum quantity T of ports usable at a same moment by the terminal device during channel or signal sending; and the determining unit is configured to determine the maximum quantity T based on the first indication information.

Optionally, the communications unit is configured to send second indication information to the terminal device, where the second indication information is used to indicate the N first ports.

Optionally, the communications unit is configured to: receive, within a first time period of the first time unit, the first channel or the first signal, and receive, within a second time period of the first time unit, the second channel or the second signal.

Optionally, there is a preset guard interval before the first time period and/or the second time period.

Optionally, the communications unit is configured to receive, within the first time unit, the first channel or the first signal on a first frequency band, and the second channel or the second signal on a second frequency band.

Optionally, the first signal is a sounding reference signal SRS, and the second channel is a physical uplink data channel PUSCH or a physical uplink control channel PUCCH; or the first channel is a PUSCH or a PUCCH, and the second signal is an SRS.

Optionally, one time unit includes at least one subframe; or one time unit includes at least one timeslot; or one time unit includes at least two symbols.

The wireless communications apparatus 500 according to this embodiment of the present invention may correspond to the network device in the methods in the embodiments of the present invention. In addition, the units, or modules, and the foregoing other operations and/or functions of the wireless communications apparatus 500 are intended to implement the corresponding procedures of the method 300 in FIG. 13. For brevity, details are not repeatedly described herein.

According to the wireless communications apparatus in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved. In addition, by making the network device determine, based on the M second ports, the signaling used to indicate a configuration parameter that is used when the terminal device sends the second channel or the second signal, and by making the network device send the signaling to the terminal device, transmission accuracy and reliability of the second channel or the second signal can be improved, and communication performance is further improved.

Figure 16:
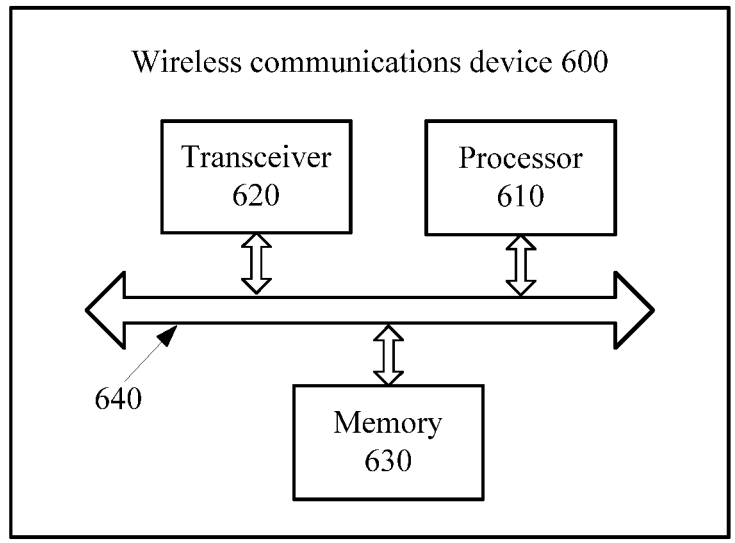
FIG. 16 is a schematic structural diagram of a wireless communications device according to one of the embodiments of the present invention.
Figure 17:
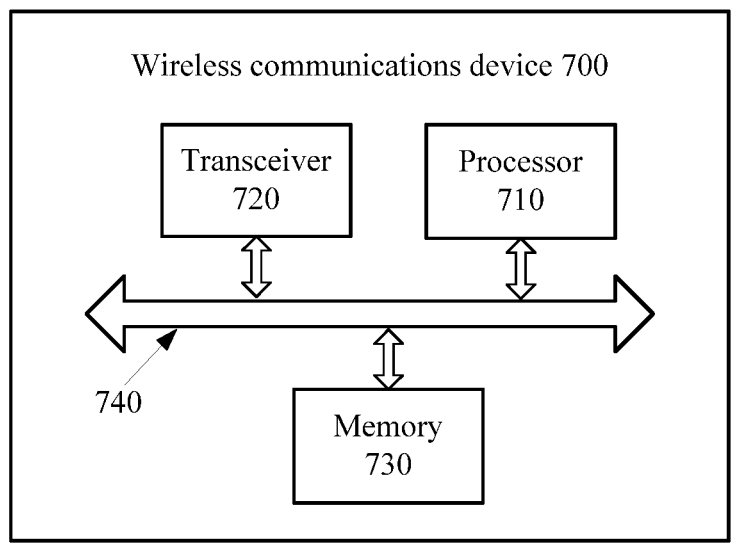
FIG. 17 is a schematic structural diagram of a wireless communications device according to another one of the embodiments of the present invention.

With reference to FIG. 1 to FIG. 13, the foregoing describes the wireless communication methods according to the embodiments of the present invention in detail. With reference to FIG. 16 and FIG. 17, the following describes wireless communications devices according to the embodiments of the present invention in detail.

FIG. 16 is a schematic block diagram of a wireless communications device 600 according to an embodiment of the present invention. As shown in FIG. 16, the device 600 includes a processor 610 and a transceiver 620, and the processor 610 is connected to the transceiver 620. Optionally, the device 600 further includes a memory 630, and the memory 630 is connected to the processor 610. Further, optionally, the device 600 includes a bus system 660. The processor 610, the memory 630, and the transceiver 620 may be connected by using the bus system 660. The memory 630 may be configured to store an instruction. The processor 610 is configured to execute the instruction stored in the memory 630, so as to control the transceiver 620 to send information or a signal.

The processor 610 is configured to determine, based on N first ports that are used, within a first time unit, for a first channel or a first signal, M second ports that are used, within the first time unit, for a second channel or a second signal, where $T \geq N \geq 1$, $T \geq M \geq 1$, and T is a maximum quantity of ports usable at a same moment by the terminal device during signal sending.

The processor 610 is configured to control the transceiver 620 to send, within the first time unit, the first channel or the first signal by using the N first ports, and send, within the first time unit, the second channel or the second signal by using the M second ports.

Optionally, the processor 610 is configured to: determine at least two first port groups, where each first port group includes at least one port that is used for the first channel or the first signal, and a quantity of ports included in each first port group is less than or equal to the maximum quantity T.

The processor 610 is configured to determine at least two second port groups, where each second port group includes at least one port that is used for the second channel or the second signal, and a quantity of ports included in each second port group is less than or equal to the maximum quantity T.

The processor 610 is configured to obtain mapping relationship information, where the mapping relationship information is used to indicate a one-to-one correspondence between the at least two first port groups and the at least two second port groups.

The processor 610 is configured to determine a target first port group from the at least two first port groups, where the N first ports belong to a same port group, and the target first port group includes the N first ports.

The processor 610 is configured to determine, based on the mapping relationship information, a target second port group corresponding to the target first port group from the at least two second port groups.

The processor 610 is configured to determine the M second ports from the target second port group.

Optionally, the processor 610 is configured to control the transceiver 620 to receive signaling that is sent by a network device and that is for the second channel or the second signal, where the signaling is determined by the network device based on the M second ports.

The processor 610 is configured to control the transceiver 620 to send, within the first time unit, the second channel or the second signal based on the signaling by using the M second ports.

Optionally, the processor 610 is configured to control the transceiver 620 to send first indication information to the network device, where the first indication information is used to indicate the maximum quantity T of ports usable at a same moment by the terminal device during channel or signal sending.

Optionally, the processor 610 is configured to control the transceiver 620 to receive second indication information sent by the network device, where the second indication information is used to indicate the N first ports.

The processor 610 is configured to determine the N first ports based on the second indication information.

Optionally, the processor 610 is configured to control the transceiver 620 to: send, within a first time period of the first time unit, the first channel or the first signal by using the N first ports, and send, within a second time period of the first time unit, the second channel or the second signal by using the M second ports.

Optionally, there is a preset guard interval before the first time period and/or the second time period.

Optionally, the processor 610 is configured to control the transceiver 620 to: send, within the first time unit, the first channel or the first signal on a first frequency band by using the N first ports, and the second channel or the second signal on a second frequency band by using the M second ports.

Optionally, the first signal is a sounding reference signal SRS, and the second channel is a physical uplink data channel PUSCH or a physical uplink control channel PUCCH; or the first channel is a PUSCH or a PUCCH, and the second signal is an SRS.

Optionally, one time unit includes at least one subframe; or one time unit includes at least one timeslot; or one time unit includes at least two symbols.

The wireless communications device 600 according to this embodiment of the present invention may correspond to the terminal device in the methods in the embodiments of the present invention. In addition, the units, or modules, and the foregoing other operations and/or functions of the wireless communications device 600 are intended to implement the corresponding procedures of the method 200 in FIG. 3. For brevity, details are not repeatedly described herein.

According to the wireless communications device in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved.

FIG. 17 is a schematic block diagram of a wireless communications device 700 according to an embodiment of the present invention. As shown in FIG. 17, the device 700 includes a processor 710 and a transceiver 720, and the processor 710 is connected to the transceiver 720. Optionally, the device 700 further includes a memory 730, and the memory 730 is connected to the processor 710. Further, optionally, the device 700 includes a bus system 770. The processor 710, the memory 730, and the transceiver 720 may be connected by using the bus system 770. The memory 730 may be configured to store an instruction. The processor 710 is configured to execute the instruction stored in the memory 730, so as to control the transceiver 720 to send information or a signal.

The processor 710 is configured to: determine, based on N first ports that are used, within a first time unit, for a first channel or a first signal of a terminal device, M second ports that are used, within the first time unit, for a second channel or a second signal of the terminal device, where $T \geq N \geq 1$, $T \geq M \geq 1$, and T is a maximum quantity of ports usable at a same moment by the terminal device during signal sending.

The processor 710 is configured to determine, based on the M second ports, signaling that is for the second channel or the second signal.

The processor 710 is configured to control the transceiver 720 to send the signaling to the terminal device.

The processor 710 is configured to control the transceiver 720 to receive, within the first time unit, the first channel or the first signal sent by the terminal device, and the second channel or the second signal sent by the terminal device, where the first channel or the first signal is sent by the terminal device by using the N first ports, and the second channel or the second signal is sent by the terminal device based on the signaling by using the M second ports.

Optionally, the processor 710 is configured to determine at least two first port groups, where each first port group includes at least one port, of the terminal device, used for the first channel or the first signal, and a quantity of ports included in each first port group is less than or equal to the maximum quantity T.

The processor 710 is configured to determine at least two second port groups, where each second port group includes at least one port, of the terminal device, used for the second channel or the second signal, and a quantity of ports included in each second port group is less than or equal to the maximum quantity T.

The processor 710 is configured to obtain mapping relationship information, where the mapping relationship information is used to indicate a one-to-one correspondence between the at least two first port groups and the at least two second port groups.

The processor 710 is configured to determine a target first port group from the at least two first port groups, where the N first ports belong to a same port group, and the target first port group includes the N first ports.

The processor 710 is configured to determine, based on the mapping relationship information, a target second port group corresponding to the target first port group from the at least two second port groups.

The processor 710 is configured to determine the M second ports from the target second port group.

Optionally, the processor 710 is configured to control the transceiver 720 to receive first indication information sent by the terminal device, where the first indication information is used to indicate the maximum quantity T of ports usable at a same moment by the terminal device during channel or signal sending.

The processor 710 is configured to determine the maximum quantity T based on the first indication information.

Optionally, the processor 710 is configured to control the transceiver 720 to send second indication information to the terminal device, where the second indication information is used to indicate the N first ports.

Optionally, the processor 710 is configured to control the transceiver 720 to: receive within a first time period of the first time unit, the first channel or the first signal, and receive, within a second time period of the first time unit, the second channel or the second signal.

Optionally, there is a preset guard interval before the first time period and/or the second time period.

Optionally, the processor 710 is configured to control the transceiver 720 to receive, within the first time unit, the first channel or the first signal on a first frequency band, and the second channel or the second signal on a second frequency band.

Optionally, the first signal is a sounding reference signal SRS, and the second channel is a physical uplink data channel PUSCH or a physical uplink control channel PUCCH; or the first channel is a PUSCH or a PUCCH, and the second signal is an SRS.

Optionally, one time unit includes at least one subframe; or one time unit includes at least one timeslot; or one time unit includes at least two symbols.

The wireless communications device 700 according to this embodiment of the present invention may correspond to the network device in the methods in the embodiments of the present invention. In addition, the units, or modules, and the foregoing other operations and/or functions of the wireless communications device 700 are intended to implement the corresponding procedures of the method 300 in FIG. 13. For brevity, details are not repeatedly described herein.

According to the wireless communications device in this embodiment of the present invention, the first ports that are used, within the first time unit, for the first channel or the first signal are determined, and the second ports that are used, within the first time unit, for the second channel or the second signal are determined based on the first ports, so as to support that there is one or more same antennas in antennas corresponding to the first ports and antennas corresponding to the second ports, and thereby support that a transmit antenna switching process is not required when the first channel or the first signal and the second channel or the second signal are sent within the first time unit. In this way, wireless communication performance is improved. In addition, by making the network device determine, based on the M second ports, the signaling used to indicate a configuration parameter that is used when the terminal device sends the second channel or the second signal, and by making the network device send the signaling to the terminal device, transmission accuracy and reliability of the second channel or the second signal can be improved, and communication performance is further improved. It should be noted that the foregoing method embodiments in the embodiments of the present invention may be applied to a processor, or be implemented by a processor. The processor may be an integrated circuit chip and has a signal processing capability. In an implementation process, the steps in the foregoing method embodiments may be implemented by using a hardware integrated logic circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. All the methods, steps, and logical block diagrams disclosed in the embodiments of the present invention can be implemented or performed by the processor. The general purpose processor may be a microprocessor or the processor may be any conventional processor, or the like. The steps of the methods disclosed in the embodiments of the present invention may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It can be understood that, the memory in the embodiments of the present invention may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory SLDRAM), and a direct rambus random access memory (DR RAM). It should be noted that the memory in the system and method described in this specification intends to include but is not limited to these memories and any other appropriate types of memories.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that the sequence numbers of the foregoing processes do not mean execution sequences of the embodiments of the present invention, and should not be construed as any limitation on the implementation processes of the embodiments of the present invention. The execution sequences of the processes should be determined based on functions and internal logic of the processes.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use a different method to implement the described functions for each particular application, but it should not be considered that the implementation goes beyond the scope of the embodiments of the present invention.

It may be clearly understood by persons skilled in the art that, for the purpose of convenient and brief description, for a detailed working process of the system, apparatus, and unit, reference may be made to a corresponding process in the method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be in electrical, mechanical, or other forms.

The units described as separate parts may or may not be physically separate. Parts displayed as units may or may not be physical units, and may be located in one position or distributed on a plurality of network units. Some or all of the units may be selected depending on actual needs to achieve the objectives of the solutions of the embodiments.

In addition, the functional units in each embodiment of the present invention may be integrated in one processing unit, or each of the units may exist alone physically, or two or more of the units may be integrated in one unit.

When the functions are implemented in a form of a software functional unit and sold or used as an independent product, the functions may be stored in a computer-readable storage medium. Based on such an understanding, the technical solutions in the embodiments of the present invention, or the part contributing to the prior art, or some of the technical solutions may be implemented in the form of a software product. The computer software product is stored in a storage medium, and includes several instructions for instructing a computer device (which may be a personal computer, a server, a network device, or the like) to perform all or some of steps of the method described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A wireless communication method comprising:
determining, by a terminal device, based on N first ports, within a first time unit for a first channel or a first signal, M second ports within the first time unit for a second channel or a second signal, wherein $T \geq N \geq 1$, $T \geq M \geq 1$, and wherein T is a maximum number of ports usable at the same time unit by the terminal device during sending;
determining, by the terminal device, at least two first port groups, wherein each first port group comprises at least one port that is used for the first channel or the first signal, and a number of ports comprised in each first port group is less than or equal to the maximum number T;
determining, by the terminal device, at least two second port groups, wherein each second port group comprises at least one port that is used for the second channel or the second signal, and a number of ports comprised in each second port group is less than or equal to the maximum number T, wherein each port is assigned to only one group; and
obtaining, by the terminal device, mapping relationship information, wherein the mapping relationship information is used to indicate a one-to-one correspondence between the at least two first port groups and the at least two second port groups,
wherein determining, by the terminal device, based on the N first ports, within the first time unit, for the first channel or the first signal, and the M second ports that correspond, within the first time unit, to the second channel or the second signal comprises:
determining, by the terminal device, a target first port group from the at least two first port groups, wherein the N first ports belong to the same port group, and the target first port group comprises the N first ports;
determining, by the terminal device, based on the mapping relationship information, a target second port group corresponding to the target first port group from the at least two second port groups; and
determining, by the terminal device, the M second ports from the target second port group;
sending, by the terminal device to a network device, within the first time unit, the first channel or the first signal by using the N first ports; and
sending, by the terminal device to the network device, within the first time unit, the second channel or the second signal by using the M second ports.

2. The method according to claim 1, further comprising:
receiving, by the terminal device, signaling that is sent by the network device and that is for the second channel or the second signal,
wherein the signaling is determined by the network device based on the M second ports,
wherein sending, by the terminal device, within the first time unit, the second channel or the second signal by using the M second ports comprises sending, by the terminal device, within the first time unit, the second channel or the second signal based on the signaling by using the M second ports.

3. The method according to claim 1, further comprising:
sending, by the terminal device, first indication information to the network device, wherein the first indication information is used to indicate the maximum number T of ports usable at the same time unit by the terminal device during channel or signal sending.

4. The method according to claim 1, further comprising:
receiving, by the terminal device, second indication information sent by the network device, wherein the second indication information is used to indicate the N first ports; and
determining, by the terminal device, the N first ports based on the second indication information.

5. A wireless communications apparatus comprising:
a processor configured to:
determine, based on N first ports, within a first time unit, for a first channel or a first signal, M second ports, within the first time unit, for a second channel or a second signal, wherein $T \geq N \geq 1$, $T \geq M \geq 1$, and wherein T is a maximum number of ports usable at the same time unit by a terminal device during sending;
determine at least two first port groups, wherein each first port group comprises at least one port that is used for the first channel or the first signal, and wherein a number of ports comprised in each first port group is less than or equal to the maximum number T;

determine at least two second port groups, wherein each second port group comprises at least one port that is used for the second channel or the second signal, and a number of ports comprised in each second port group is less than or equal to the maximum number T, wherein each port is assigned to only one group;

obtain mapping relationship information, wherein the mapping relationship information is used to indicate a one-to-one correspondence between the at least two first port groups and the at least two second port groups;

determine a target first port group from the at least two first port groups, wherein the N first ports belong to the same port group, and the target first port group comprises the N first ports;

determine, based on the mapping relationship information, a target second port group corresponding to the target first port group from the at least two second port groups; and determine the M second ports from the target second port group; and a transceiver configured to:

send to a network device, within the first time unit, the first channel or the first signal by using the N first ports; and send to the network device, within the first time unit, the second channel or the second signal by using the M second ports.

6. The apparatus according to claim 5, wherein the transceiver is configured to:

receive signaling that is sent by the network device and that is for the second channel or the second signal, wherein the signaling is determined by the network device based on the M second ports; and send, within the first time unit, the second channel or the second signal based on the signaling by using the M second ports.

7. The apparatus according to claim 5, wherein the transceiver is configured to send first indication information to the network device, wherein the first indication information is used to indicate the maximum number T of ports usable at the same time unit by the terminal device during channel or signal sending.

8. The apparatus according to claim 5, wherein the transceiver is configured to receive second indication information sent by the network device, wherein the second indication information is used to indicate the N first ports, and wherein the processor is configured to determine the N first ports based on the second indication information.

9. A wireless communications apparatus comprising:

a processor configured to:

determine, based on N first ports, within a first time unit, for a first channel or a first signal of a terminal device, M second ports, within the first time unit, for a second channel or a second signal of the terminal device, wherein $T \geq N \geq 1$, $T \geq M \geq 1$, and wherein T is a maximum number of ports usable at a same time unit by the terminal device during sending;

determine, based on the M second ports, signaling that is for the second channel or the second signal;

determine at least two first port groups, wherein each first port group comprises at least one port of the terminal device used for the first channel or the first signal, and wherein a number of ports comprised in each first port group is less than or equal to the maximum number T;

determine at least two second port groups, wherein each second port group comprises at least one port of the terminal device used for the second channel or the second signal, and wherein a number of ports comprised in each second port group is less than or equal to the maximum number T, wherein each port is assigned to only one group;

obtain mapping relationship information used to indicate a one-to-one correspondence between the at least two first port groups and the at least two second port groups;

determine a target first port group from the at least two first port groups, wherein the N first ports belong to the same port group, and the target first port group comprises the N first ports;

determine, based on the mapping relationship information, a target second port group corresponding to the target first port group from the at least two second port groups; and determine the M second ports from the target second port group; and a transceiver configured to:

send the signaling to the terminal device; and receive, within the first time unit, the first channel or the first signal sent by the terminal device, and the second channel or the second signal sent by the terminal device, wherein the first channel or the first signal is sent by the terminal device by using the N first ports, and the second channel or the second signal is sent by the terminal device based on the signaling by using the M second ports.

10. The apparatus according to claim 9, wherein the processor is configured to:

receive first indication information sent by the terminal device, wherein the first indication information is used to indicate the maximum number T of ports usable at the same time unit by the terminal device during channel or signal sending; and determine the maximum number T based on the first indication information.

11. The apparatus according to claim 9, wherein the processor is configured to send second indication information to the terminal device, and wherein the second indication information is used to indicate the N first ports.

12. The apparatus according to claim 9, wherein the processor is configured to:

receive, within a first time period of the first time unit, the first channel or the first signal; and receive, within a second time period of the first time unit, the second channel or the second signal.

* * * * *